United States Patent
Amimori et al.

(10) Patent No.: US 8,253,898 B2
(45) Date of Patent: Aug. 28, 2012

(54) TRANSFER MATERIAL, AND PROCESS FOR PRODUCING LIQUID CRYSTAL CELL SUBSTRATE AND LIQUID CRYSTAL DISPLAY DEVICE USING THE SAME

(75) Inventors: Ichiro Amimori, Minami-ashigara (JP); Wakahiko Kaneko, Minami-ashigara (JP); Satomi Suzuki, Minami-ashigara (JP); Hideki Kaneiwa, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 633 days.

(21) Appl. No.: 11/887,236

(22) PCT Filed: Mar. 29, 2006

(86) PCT No.: PCT/JP2006/307174
§ 371 (c)(1),
(2), (4) Date: Sep. 27, 2007

(87) PCT Pub. No.: WO2006/104252
PCT Pub. Date: Oct. 5, 2006

(65) Prior Publication Data
US 2009/0174857 A1    Jul. 9, 2009

(30) Foreign Application Priority Data

Mar. 29, 2005 (JP) ................. 2005-093976
Sep. 29, 2005 (JP) ................. 2005-283382
Feb. 14, 2006 (JP) ................. 2006-036410

(51) Int. Cl.
G02F 1/1333  (2006.01)
G02F 1/1335  (2006.01)

(52) U.S. Cl. .................. 349/117; 349/158; 430/20

(58) Field of Classification Search .............. 428/1.3; 349/117, 158; 430/20
See application file for complete search history.

(56) References Cited

U.S. PATENT DOCUMENTS

| 4,353,978 | A | | 10/1982 | Leberzammer et al. |
| 5,831,703 | A | * | 11/1998 | Nishiguchi et al. ........... 349/117 |
| 5,953,091 | A | * | 9/1999 | Jones et al. ................... 349/129 |
| 2003/0031845 | A1 | | 2/2003 | Umeya et al. |

(Continued)

FOREIGN PATENT DOCUMENTS

EP    0 281 031 A3    9/1988

(Continued)

OTHER PUBLICATIONS

PCT/ISA/210 and PCT/ISA/237 for PCT/JP2006/307174 dated Sep. 28, 2006.

(Continued)

Primary Examiner — Nathanael R Briggs
(74) Attorney, Agent, or Firm — Buchanan Ingersoll & Rooney PC

(57) ABSTRACT

A novel transfer material is disclosed. The transfer material comprises, at least, a support, and, thereon, an optically uniaxial or biaxial anisotropic layer and a photosensitive polymer layer. A novel process for producing a liquid crystal cell substrate is also disclosed. The process comprises, at least, [1] laminating a transfer material as set forth in any one of claims 1 to 11 on a substrate; [2] removing the support from the transfer material laminated on the substrate; and [3] exposing the photosensitive polymer layer disposed on the substrate to light.

20 Claims, 8 Drawing Sheets

U.S. PATENT DOCUMENTS

| | | | | |
|---|---|---|---|---|
| 2003/0189684 A1* | 10/2003 | Kuntz et al. | | 349/123 |
| 2004/0008305 A1* | 1/2004 | Payne et al. | | 349/117 |
| 2004/0151846 A1* | 8/2004 | Aminaka et al. | | 428/1.3 |
| 2006/0110549 A1* | 5/2006 | Wang et al. | | 428/1.3 |

FOREIGN PATENT DOCUMENTS

| | | |
|---|---|---|
| EP | 1 336 874 A3 | 8/2003 |
| GB | 2 394 718 A | 5/2004 |
| JP | 10-161108 A | 6/1998 |
| JP | 2002-006138 A | 1/2002 |
| JP | 2003-251643 A | 9/2003 |
| JP | 2004-37837 A | 2/2004 |
| WO | WO 03/054111 A1 | 7/2003 |

OTHER PUBLICATIONS

Official Action dated Mar. 15, 2011, issued by the Japanese Patent Office in corresponding application No. 2006-036410, and English language translation of the Official Action.

Taiwanese Office Action (Notification for the Opinion of Examination) issued on Apr. 18, 2012, in corresponding Taiwanese Patent Application No. 095110837, together with an English translation thereof.

* cited by examiner (a)

(b)

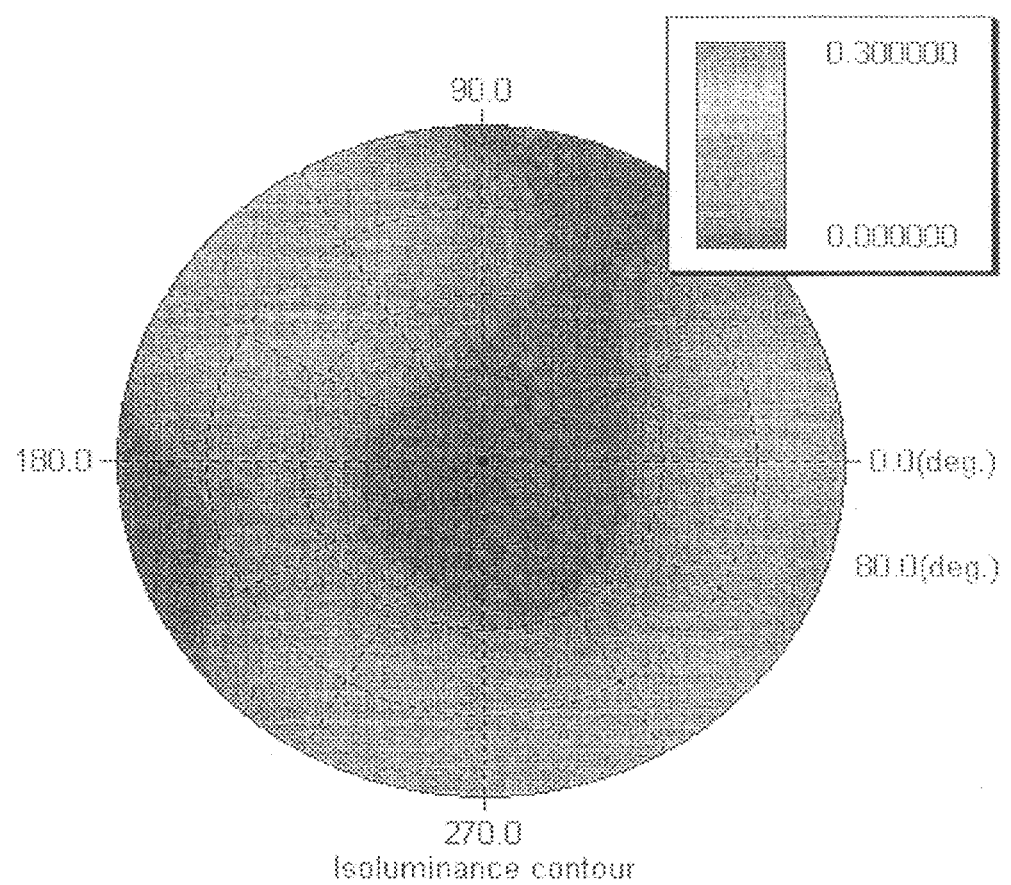

TRANSFER MATERIAL, AND PROCESS FOR PRODUCING LIQUID CRYSTAL CELL SUBSTRATE AND LIQUID CRYSTAL DISPLAY DEVICE USING THE SAME

TECHNICAL FIELD

The present invention relates to a transfer material useful for producing a liquid crystal cell substrate having an optically anisotropic layer formed thereon, and a liquid crystal display device, and in particular to a transfer material useful for producing a liquid crystal cell substrate applicable to a liquid crystal display device excellent in the viewing-angle-dependence of color, and a liquid crystal display device using such liquid crystal cell substrate.

RELATED ART

A CRT (cathode ray tube) has been mainly employed in various display devices used for office automation (OA) equipment such as a word processor, a notebook-sized personal computer and a personal computer monitor, mobile phone terminal and television set. A liquid crystal display device has advantages in its thinness, lightweight and low power consumption, and, in recent years, it has more widely been used in the place of a CRT. A liquid crystal display device usually comprises a liquid crystal cell and polarizing plates. The polarizing plate usually has protective films and a polarizing film, and is obtained typically by dying the polarizing film composed of a polyvinyl alcohol film with iodine, stretching, and being stacked on both surfaces thereof with the protective films. A transmissive liquid crystal display device usually comprises polarizing plates on both sides of the liquid crystal cell, and occasionally comprises one or more optical compensation films. A reflective liquid crystal display device usually comprises a reflector plate, the liquid crystal cell, one or more optical compensation films, and a polarizing plate in this order. The liquid crystal cell comprises liquid-crystalline molecules, two substrates encapsulating the liquid-crystalline molecules, and electrode layers applying voltage to the liquid-crystalline molecules. The liquid crystal cell switches ON and OFF displays depending on variation in orientation state of the liquid-crystalline molecules, and is applicable both to transmission type and reflective type, of which display modes ever proposed include TN (twisted nematic), IPS (in-plane switching), OCB (optically compensatory bend) and VA (vertically aligned) ECB (electrically controlled birefringence), and STN (super twisted nematic). Color and contrast displayed by the conventional liquid crystal display device, however, vary depending on the viewing angle. Therefore, it cannot be said that the viewing angle characteristics of the liquid crystal display device is superior to those of the CRT.

In order to improve the viewing angle characteristics, retardation plates for viewing-angle optical compensation, or, in other words, optical compensation sheets, have been used. There have been proposed various LCDs, employing a mode and an optical compensation sheet having an appropriate optical property for the mode, excellent in contrast characteristics without dependency on viewing angles. An OCB, VA or IPS modes are known as a wide-viewing mode, and LCDs employing such a mode can give a good contrast characteristic in all around view, and, then, become widely used as a home screen such as TV. And, in recent years, wide screen over 30 inches LCDs employing such a mode have been also proposed.

Wide-screen LCDs suffer from light leakages from the corner portions, or, in other words, corner non-uniformities. It is considered that such phenomenon is caused by dimensional changes in the polarizer plates, which are employed in the LCDs, depending on environmental moisture. In particular for the case where a polarizer plate and an optical compensation sheet are bonded directly or bonded with an adhesive layer disposed between them, the optical compensation sheet may be changed in dimension with the polarizer plate, and, therefore, the optical characteristics of the optical compensation sheet may be varied with the dimensional change. And, in such a case, the corner non-uniformity may be worsened.

An optical compensation sheet can effectively contribute to reducing the viewing angle dependence of contrast, but cannot contribute to reducing the viewing angle dependence of color sufficiently, and reducing the viewing angle dependence of color is considered as an important problem to be solved for LCD. Viewing angle dependence of color of LCD is ascribable to difference in wavelength of three representative colors of R, G and B, so that even R, G and B lights go through are given equal retardation, the changes in polarization states of R, G and B lights brought about by the retardation are different each other. In view of optimizing this, it is necessary to optimize wavelength dispersion of birefringence of an optically anisotropic material with respect to the wavelengths of R, G and B. The LCD is, however, still on the way to thorough improvement in the viewing angle dependence of color, because it is still not easy to control the wavelength dispersion of birefringence of liquid crystal molecules used for ON/OFF display, or for optical compensation sheet.

There has been proposed a retardation plate using a modified polycarbonate, as an optical compensation sheet controlled in the wavelength dispersion of birefringence for improving the viewing angle dependence of color (Japanese Laid-Open Patent Publication "Tokkai" No. 2004-37837). The viewing angle dependence of color can be improved by using this plate as a λ/4 plate for reflection-type liquid crystal display device, or as a compensation sheet for VA-mode device. It has, however, not been widely used yet for LCD, not only because the modified polycarbonate film is expensive, but also because the film tends to cause non-uniformity in the optical characteristics such as bowing during stretching included in the process of producing them.

On the other hand, there has been also proposed a system of compensating the wavelength dispersion independently for each of three colors of R, G and B, although a principle thereof is the same with the viewing-angle compensation of contrast using the optical compensation sheet (GB2394718). The optical compensation sheet is formed with a color filter or the like inside of a liquid crystal cell by a patterning process. This process, however, is not usable from not only the viewpoint of difficulty in forming the optically anisotropic layer having a uniform retardation characteristic inside of a liquid crystal cell using a patternable material, from but also the viewpoint of increase of the cost due to a lot of steps such as patterning the optically anisotropic layer three times for R, G and B, while ensuring alignment on the patterned color filter.

SUMMARY OF THE INVENTION

It is therefore an object of the present invention to provide a transfer material useful for producing a liquid crystal cell substrate having formed thereon an optically anisotropic layer capable of optically compensating retardation of a liquid crystal cell. It is another object of the present invention to provide a transfer material useful for producing a liquid crystal cell substrate contributive to improvement in the viewing angle dependence of color. It is a still another object to provide a liquid crystal display device comprising a liquid crystal cell optically compensated therein in an exact manner, being excellent in the productivity, and being improved in the viewing angle dependence of color.

In one aspect, the present invention provides a transfer material comprising, at least, a support, and, thereon, an optically uniaxial or biaxial anisotropic layer and a photosensitive polymer layer.

The optically anisotropic layer may be formed by applying a fluid comprising a liquid crystalline compound having at least one reactive group to a surface and drying the fluid to thereby form a liquid crystal layer, and then applying heat or irradiating ionized radiation to the liquid crystal layer. The ionized radiation may be polarized ultraviolet radiation. And the optically anisotropic layer may be formed on a surface of the support, or on a surface of an alignment layer formed on the support.

As embodiments of the present invention, there are provided the transfer material wherein the liquid crystalline compound is a rod-like liquid crystalline compound; the transfer material wherein the liquid crystalline compound is a discotic liquid crystalline compound; the transfer material wherein the reactive group is an ethylenic unsaturated group; and the transfer material wherein the optically anisotropic layer is a layer formed by applying heat or irradiating ionized radiation to the liquid crystal layer exhibiting a cholesteric phase.

As embodiments of the present invention, there are also provided the transfer material wherein a frontal retardation (Re) value of the optically anisotropic layer is not zero, and the optically anisotropic layer gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis); and the transfer material wherein the optically anisotropic layer has a frontal retardation (Re) value of 60 to 200 nm, and gives a retardation of 50 to 250 nm when light of a wavelength λ nm coming in a direction rotated by +40° with respect to a normal direction of a layer plane using an in-plane slow axis as a tilt axis (a rotation axis).

The photosensitive polymer layer, included in the transfer material, may comprise a dye or a pigment.

In another aspect, the present invention provides a process for producing a liquid crystal cell substrate comprising at least steps [1] to [3] below:

[1] laminating a transfer material of the present invention on a substrate;

[2] removing the support from the transfer material laminated on the substrate; and

[3] exposing the photosensitive polymer layer disposed on the substrate to light; and a process for producing a liquid crystal cell substrate comprising at least steps [1] to [4] below:

[1] laminating the transfer material of the present invention on a substrate; and

[2] removing the support from the transfer material laminated on the substrate;

[3] patterning the photosensitive polymer layer disposed on the substrate using light exposure; and

[4] removing unnecessary portions of the photosensitive polymer layer and the optically anisotropic layer from on the substrate. These processes may comprise the steps in these orders.

The present invention also relates to a liquid crystal cell substrate produced according to the method as set forth above; and a liquid crystal display device comprising the liquid crystal cell substrate. The liquid crystal display device of the present invention may employ a VA or IPS mode as a liquid crystal mode; or a semi-transmissive mode.

BRIEF DESCRIPTION OF THE DRAWINGS

FIG. 8 is a drawing showing viewing angle dependence of luminance in a black state of the semi-transmissive liquid crystal display devices produced in Comparative Example 2.

Figure 1:
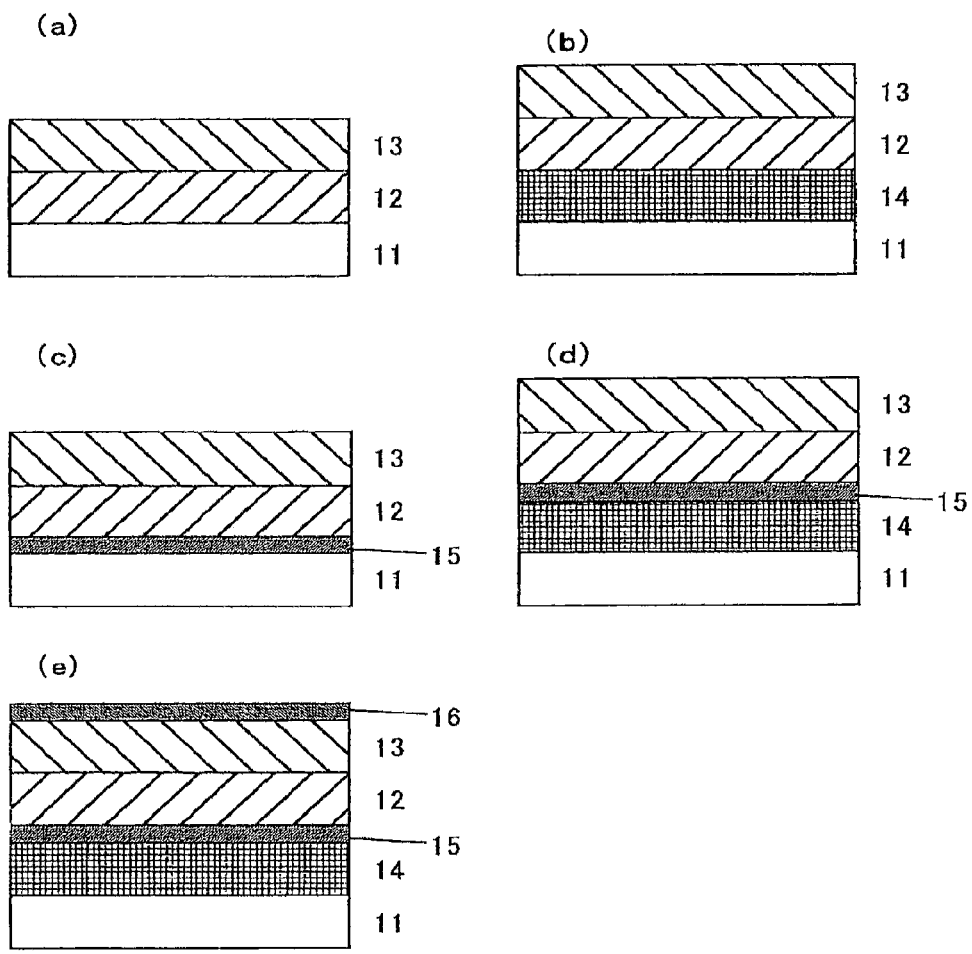
FIGS. 1(a) to 1(e) are schematic sectional views showing examples of the transfer material of the present invention.

Reference numerals used in the drawings express the followings:

11 temporary support;
12 optically anisotropic layer;
13 photosensitive polymer layer;
14 mechanical characteristic control layer;
15 alignment layer;
16 protective layer;
21 target substrate;
22 black matrix;
23 color filter layer;
24 optically anisotropic layer;
25 transparent electrode layer;
26 alignment layer;
31 liquid crystal;
32 TFT;
33 polarizing layer;
34 cellulose acetate film (polarizer plate protective film);
35 cellulose acetate film, or optical compensation sheet;
36 polarizer plate; and
37 liquid crystal cell.

DETAILED DESCRIPTION OF THE INVENTION

Paragraphs below will detail the present invention.

In the specification, ranges indicated with "to" mean ranges including the numerical values before and after "to" as the minimum and maximum values.

In this patent specification, retardation value Re is defined as being calculated based on the process below. Re(λ) expresses in-plane retardation at wavelength λ. Re(λ) is measured according to the parallel Nicol method by allowing light of λ nm in the normal direction to be incident on the film. In this specification, λ is 611±5 nm, 545±5 nm and 435±5 nm for R, G and B, respectively, and denotes 545±5 nm or 590±5 nm if no specific description is made on color.

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of this specification means that a tolerance of less than ±5% with respect to the precise values can be allowed. It is also to be noted that the term "The Re value is not zero" in the context of this specification means that the Re value is not less than 5 nm. The measurement wavelength for refractive indexes is a visible light wavelength, unless otherwise specifically noted. It is also to be noted that the term "visible light" in the context of this specification means light of a wavelength falling within the range from 400 to 700 nm.

[Transfer Material]

The transfer material of the present invention comprises a support, at least one optically anisotropic layer and at least one photosensitive polymer layer, and is a material used for transferring the optically anisotropic layer and the photosensitive polymer layer onto other substrate. FIGS. 1(a) to 1(e) are schematic sectional views showing several examples of the transfer material of the present invention. The transfer material of the present invention shown in FIG. 1(a) comprises a transparent or opaque temporary support 11, and an optically anisotropic layer 12 and a photosensitive polymer layer 13 formed thereon. The transfer material of the present invention may comprise other layers, and may have, typically as shown in FIG. 1(b), a layer 14 for dynamic property control, such as cushioning for absorbing irregularity on the target substrate side, or for imparting conformity to such irregularity, provided between the support 11 and the optically anisotropic layer 12, or may comprise, typically as shown in FIG. 1(c), a layer 15 functioning as an alignment layer controlling orientation of the liquid crystalline molecules in the optically anisotropic layer 12, or may comprise, typically as shown in FIG. 1(d), both of these layers. It is still also allowable to provide, as shown in FIG. 1(e), a separative protective layer 16 on the top surface, typically for the purpose of surface protection.

[Substrate for Liquid Crystal Display Device]

The optically anisotropic layer of the transfer material of the present invention may be transferred onto a substrate for liquid crystal display device on from the support, so as to be used for optically compensating retardation of a liquid crystal cell. The optically anisotropic layer formed inside of the liquid crystal cell may optically compensate retardation of the liquid crystal cell in an independent manner or in combination with other optically anisotropic layer disposed outside the cell. The photosensitive polymer layer is transferred together with the optically anisotropic layer onto the substrate, such as a cell substrate for example, and may contribute to adhering the optically anisotropic layer and the target transfer substrate. The photosensitive polymer layer may also contribute to patterning the optically anisotropic layer with difference in solubility of the light-exposed portion and non-exposed portion thereof. Using the photosensitive polymer layer for formation of a color filter makes it possible to form the optically anisotropic layers capable of optically compensating retardations of a liquid crystal cell for R, G and B respectively. The substrate having such layer transferred thereon may be used for either one of a pair of substrates of the liquid crystal cell, or may be used for both in a divided manner.

FIG. 2(a) shows a schematic sectional view showing an example of a substrate having an optically anisotropic layer, produced by using the transfer material of the present invention. Unlike the conventional cases where the optically anisotropic layer is provided on a plastic support which is likely to cause dimensional changes with environmental temperature or humidity, the optical anisotropic layer provided in the cell using the transfer material of the present invention as shown in FIG. 2(a) is less likely to cause dimensional changes with environmental temperature or humidity, because the optically anisotropic layer is tightly held by a glass substrate, and thereby makes it possible to reduce the corner non-uniformity. The target substrate 21 is not specifically limited so far as it is transparent, but is preferably a support having a small birefringence, so that small-birefringent polymer or the like can be used. On the substrate, there is provided an optically anisotropic layer 24 formed by using the transfer material of the present invention, and further thereon, a black matrix 22 and a color filter layer 23 are formed. Although not illustrated in FIG. 2(a), there is disposed, between the optically anisotropic layer 24 and the substrate 21, a photosensitive polymer layer which is a constituent layer of the transfer material, having a function of adhering the optically anisotropic layer 24 and the substrate 21. Further on the color filter layer 23, there are formed a transparent electrode layer 25, and still further thereon, there is formed an alignment layer 26 aligning the liquid crystal molecules in the liquid crystal cell. After the optically anisotropic layer 24 is formed on the substrate 21 using the transfer material of the present invention, the black matrix 22 and the color filter layer 23 may be formed by a method of coating a resist material and thereafter by removing the unnecessary portion thereof by light exposure through a mask and development, or may be formed making use of recently-proposed printing system or ink jet system. The latter is more preferable in view of cost.

FIG. 2(b) is a schematic sectional view showing an example of a substrate of the present invention, having a color filter provided with an optically anisotropic layer, produced by using the transfer material of the present invention. The target substrate 21 is not specifically limited so far as it is transparent, but is preferably a support having a small birefringence, so that small-birefringent polymer or the like can be used. The target substrate generally has the black matrix 22 formed thereon, and further thereon, there are formed the color filter layer 23 composed of the photosensitive polymer layer and the optically anisotropic layer 27, which are transferred from the transfer material of the present invention, and patterned by light exposure through a mask. Through the transfer-and-patterning steps, the optically anisotropic layer and the color filter layer can be formed in an adjacent manner simultaneously, so that it is made possible to form, on the color filter, the optically anisotropic layer optimized for the individual colors of R, G and B, without increasing the number of steps. The embodiment shown in FIG. 2(b), producing by using the transfer material of the present invention, therefore makes it possible to improve the viewing angle dependence of color, without lowering the productivity.

The optically anisotropic layer 27 is divided into r, g and b regions, and has optimum retardation characteristics optimized for each of the filter layers 23 of R, G and B. Any other layers transferred from the transfer material may reside on the optically anisotropic layer 27, but such layers are preferably removed during development and cleaning for the patterning, because it is necessary to avoid as possible impurity contamination in the liquid crystal cell. On the optically anisotropic layer 27, there is formed the transparent electrode layer 25, and further thereon, there is formed an alignment layer 26 aligning the liquid crystal molecules in the liquid crystal cell.

It is still further allowable, as shown in FIG. 2(c), to provide two layers on a single target substrate, one of which is the non-patterned optically anisotropic layer 24 and the other is the patterned optically anisotropic layer 27 formed using the transfer material of the present invention. The non-patterned optically anisotropic layer may be the one formed by using the transfer material of the present invention, or may be the one formed by any other methods. There is no special limitation also on materials for composing the non-patterned optically anisotropic layer. Although not illustrated, it is also allowable to form the non-patterned optically anisotropic layer 24 on one of a pair of opposed substrates of the liquid crystal cell, and to form the patterned optically anisotropic layer 27 together with the color filter layers 23 on the other substrate.

For the case of such division in two, the optically anisotropic layers 24, 27 may be formed on the same substrate side of the color filter side, or may be on the opposing substrate side, although not illustrated. They may be formed anywhere on the opposing substrate, where one of the pair of opposing substrates often has a drive electrode, such as a TFT array disposed thereon, but are preferably formed in the upper layer of silicon for an active-matrix -type device having the TFT, considering heat resistance of the optically anisotropic layer.

Use of the transfer material of the present invention makes it possible to simultaneously form the color filter of one color and the correspondent optically anisotropic layer by one routine of transfer/light-exposure/development, and to produce a color filter substrate, which can contribute to improving the viewing angle characteristics of liquid crystal display device, according to a process including the same number of steps as in the process for producing a color filter described in Japanese Laid-Open Patent Publication "Tokkaihei" No. 3-282404.

Figure 2:
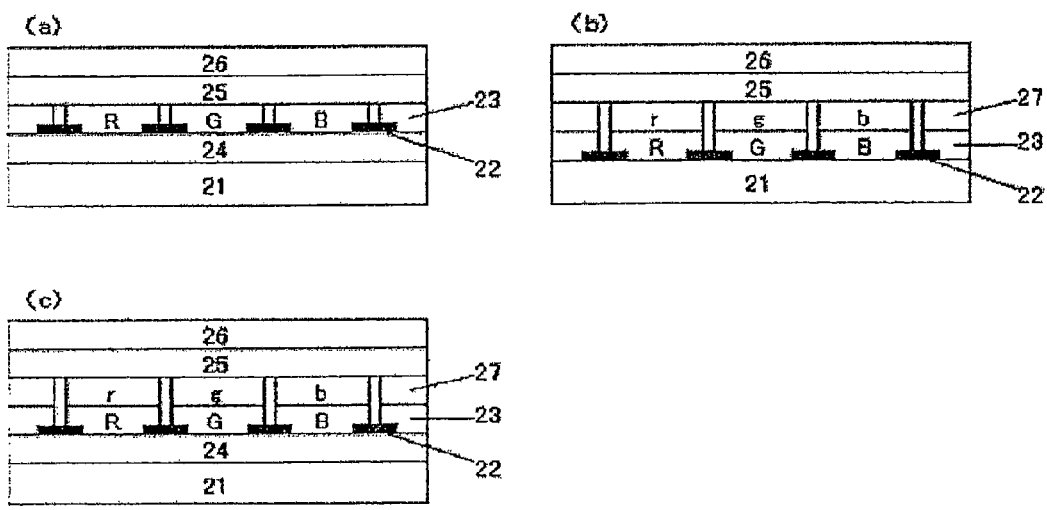
FIGS. 2(a) to 2(c) are schematic sectional views showing examples of the liquid crystal cell substrate of the present invention.

It is to be noted that FIGS. 2(*a*) to 2(*c*) showed the embodiments comprising R, G and B color filter layers 23 formed therein, whereas it is also allowable to form color filter layers composed of R, G, B and W (white), as is often found in these years.

[Liquid Crystal Display Device]

Figure 3:
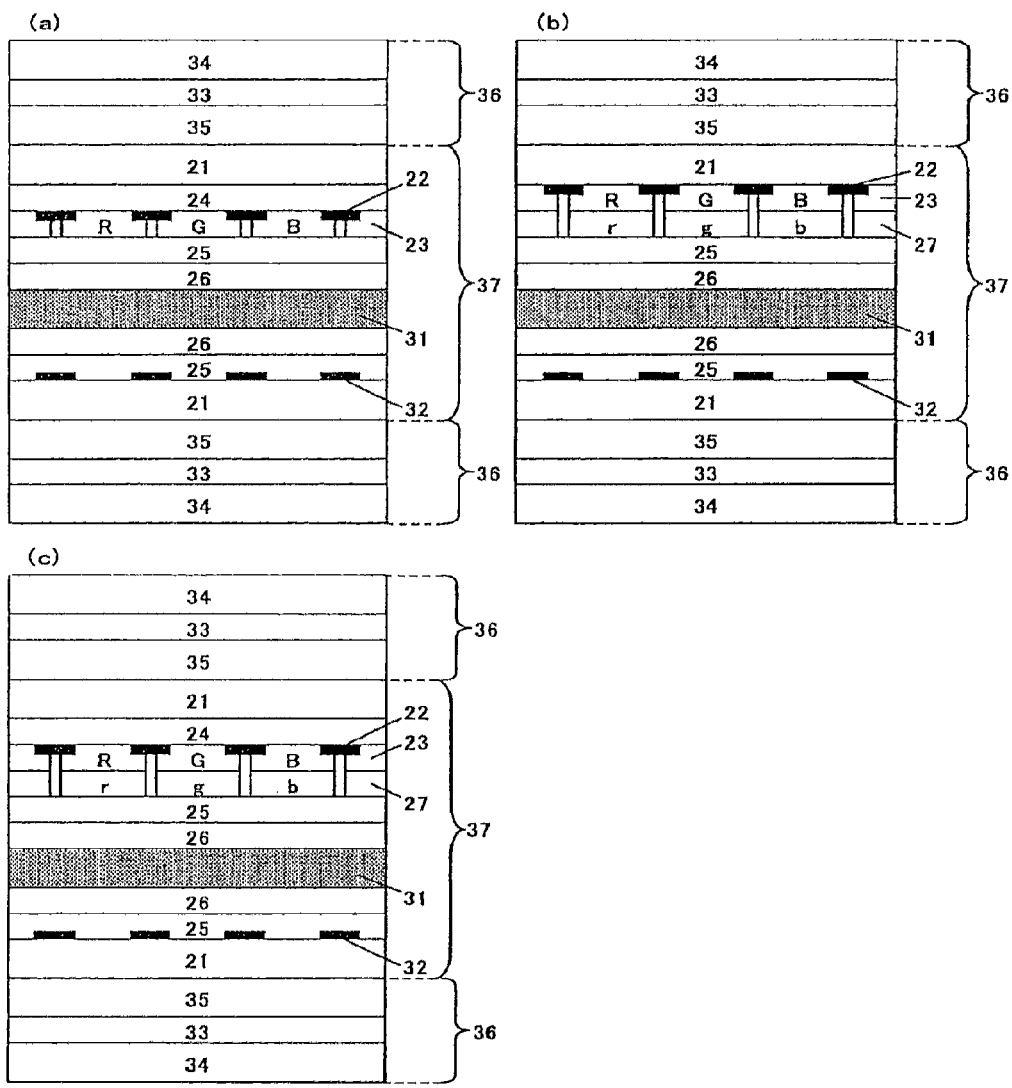
FIGS. 3(a) to 3(c) are schematic sectional views showing examples of the liquid crystal display device of the present invention.

FIGS. 3(*a*) to 3(*c*) are schematic sectional views showing examples of the liquid crystal display device of the present invention. FIGS. 3(*a*) to 3(*c*) exemplify the liquid crystal display devices using the liquid crystal cells 37 respectively configured by using the glass substrates shown in FIGS. 2(*a*) to 2(*c*) as the upper substrates, using the substrates with TFTs 32 as the opposing substrates, and holding the liquid crystal in between. Respectively on both sides of each liquid crystal cell 37, there is disposed a polarizer plate 36 configured by two cellulose ester films 34, 35 and a polarizing layer 33 held in between. The cellulose ester film 35 on the liquid crystal cell side may be used as the optical compensation sheet, or may be same as the cellulose ester film 34. Although not illustrated, an embodiment of a reflection-type liquid crystal display device allows only one polarizer plate disposed on the observer's side, and a reflection film is disposed on the back surface of the liquid crystal cell or on the inner surface of the lower substrate. Of course, it is also allowable to dispose a front light on the observer's side of the liquid crystal cell. A semi-transmissive configuration, having both of a transmissive domain and a reflective domain in one pixel of the display device, is also allowable. Display mode of the liquid crystal display device is not specifically limited, and the present invention is applicable to any transmission-type and reflection-type liquid crystal display devices. Among others, the present invention is more effective for VA-mode device for which improvement in the viewing angle dependence of color is desired.

Figure 6:
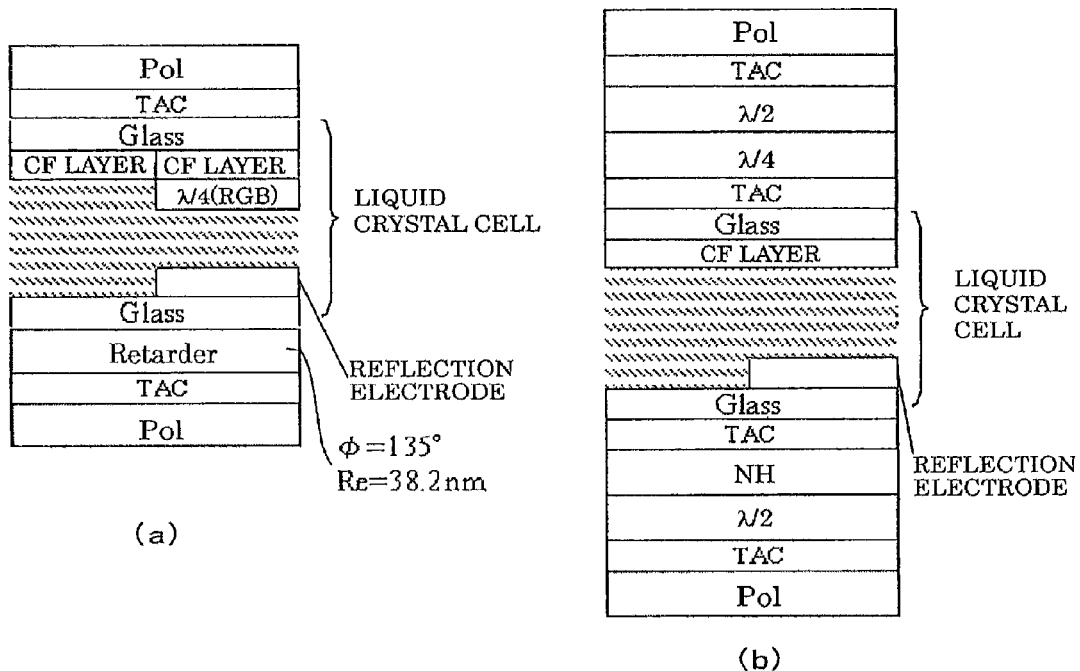
FIGS. 6(a) and 6(b) are schematic sectional views showing semi-transmissive liquid crystal display devices produced in Example 11 and Comparative Example 2.

It is also preferable to adopt the present invention to semi-transmissive liquid crystal display device. An embodiment of the semi-transmissive liquid crystal display device of the present invention relates to an embodiment described later in Example 11, referring to FIG. 6(*a*). More specifically, this is a liquid crystal display device comprising a semi-transmissive liquid crystal cell in which a first substrate ("Glass" in the drawing) having a reflection electrode formed on at least a portion thereof, and a second substrate ("Glass" in the drawing) having a photosensitive polymer layer ("CF layer" in the drawing) formed on at least a portion thereof are disposed so as to oppose the reflection electrode and the photosensitive polymer layer, and a liquid crystal material is held between the substrates. The second substrate has a uniaxial or a biaxial optically anisotropic layer ("λ/4(RGB)" in the drawing) formed thereon on the photosensitive polymer layer side. The optically anisotropic layer is a layer transferred from the transfer material of the present invention. As shown in FIG. 6(*a*), the photosensitive polymer layer configured as a colored layer allows it to function as a color filter. As shown in FIG. 6(*a*), the optically anisotropic layer is preferably patterned only at positions opposing to the reflection electrode on the first substrate. Use of the transfer material of the present invention makes it possible to readily pattern the optically anisotropic layer. The optically anisotropic layer is preferably disposed in adjacent to the second substrate or the photosensitive polymer layer.

Next paragraphs will detail materials and methods which are useful for producing the transfer material of the present invention.

The transfer material of the present invention comprises a support, the above-described optically anisotropic layer, and the above-described photosensitive polymer layer. Application of the transfer material of the present invention is not specifically limited, wherein it is preferable to use it for producing members of liquid crystal display devices. In such embodiment, the optically anisotropic layer may contribute to optical compensation of the liquid crystal display device, that is, contribute to widen the viewing angle ensuring desirable contrast and to cancel coloration of image on the liquid crystal display device. The photosensitive polymer layer also may function as a resist layer for patterning the optically anisotropic layer. The patterned resist layer may be used as a part of, or the entire portion of the color filter. Use of the transfer material of the present invention makes it possible to transfer the optically anisotropic layer and the color filter composed of the photosensitive polymer layer at the same time onto the glass substrate of the liquid crystal display device, and this consequently makes it possible to provide a color filter substrate which contributes to improve the viewing angle characteristics of the liquid crystal display device, in particular the viewing angle dependence of color, almost without varying the number of process steps.

Paragraphs below will detail the present invention with respect to materials and processes used for the production. It is to be noted that the present invention is by no means limited to the embodiments below, and any other embodiments can be carried out referring to the description below and known methods, so that the present invention is not limited to the embodiment of the transfer material explained below.

[Support]

The support, which can be used in the transfer material of the present invention, may be transparent or opaque. Polymer films may be used as a support. Examples of the polymer film, which can be used as a support, however not limited to them, include cellulose ester films such as cellulose acetate films, cellulose propionate films, cellulose butyrate films, cellulose acetate propionate films and cellulose acetate butyrate films; polyolefin films such as norbornene based polymer films, poly(meth)acrylate films such as polymethylmethacrylate films, polycarbonate films, polyester films and polysulfone films. In the view of checking properties during manufacturing process, the support is preferably selected from transparent and low-birefringence polymer films. Examples of the low-birefringence polymer films include cellulose ester films and norbornene based polymer films. Commercially available polymers (for example, as a norbornene based polymer, "ARTON" provided by JSR and "ZEONEX" and "ZEONOR" provided by ZEON CORPORATION) may be employed.

[Optically Anisotropic Layer]

The optically anisotropic layer included in the transfer material of the present invention is not specifically limited so far as the layer gives an retardation, which is not substantially zero, for a light incoming in a direction, that is, so far as the layer has an optical characteristic not understood as being isotropic. The layer is preferably formed by curing a liquid crystal layer comprising at least one species of liquid crystalline compound by ultraviolet irradiation, from the viewpoint that it is used in the liquid crystal cell, and that the optical characteristics can readily be controlled.

[Optically Anisotropic Layer Formed of Composition Containing Liquid Crystalline Compound]

The optically anisotropic layer functions as compensating the viewing angle of the liquid crystal device, by being incorporated into the liquid crystal cell as described in the above. Not only an embodiment in which the optically anisotropic layer can independently exhibit a sufficient level of optical compensation property, but also an embodiment in which an optical characteristic necessary for the optical compensation is satisfied after being combined with other layer (for example, optically anisotropic layer disposed outside the liquid crystal cell) are within the scope of the present invention. It is not necessary for the optically anisotropic layer included in the transfer material to have an optical characteristic sufficient for satisfying the optical compensation property, and instead the layer may be finally exhibiting an optical characteristic necessary for the optical compensation. The optical characteristics of the layer may be generated or changed in the exposure step carried out during the process of transferring onto the liquid crystal cell substrate.

The optically anisotropic layer is preferably formed of a composition comprising at least one liquid crystalline compound. The liquid-crystalline compounds can generally be classified by molecular geometry into rod-like one and discotic one. Each category further includes low-molecular type and high-molecular type. The high-molecular type generally refers to that having a degree of polymerization of 100 or above ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline molecule may be adoptable in the present invention, wherein it is preferable to use a rod-like liquid-crystalline compound or a discotic liquid-crystalline compound. It is also allowable to use a mixture of two or more rod-like liquid-crystalline compound, a mixture of two or more discotic liquid-crystalline compound, or a mixture of a rod-like liquid-crystalline compound and a discotic liquid-crystalline compound. It is more preferable that the optically anisotropic layer is formed using a composition comprising the rod-like liquid-crystalline compound or the discotic liquid-crystalline compound, having a reactive group, because such compound can reduce temperature- and moisture-dependent changes, and it is still further preferable that at least one compound in the mixture has two or more reactive group in a single liquid-crystalline molecule. The liquid-crystalline composition may be a mixture of two or more compounds, wherein it is preferable that at least one of the compounds has two or more reactive groups. The thickness of the optically anisotropic layer is preferably 0.1 to 20 μm, and more preferably 0.5 to 10 μm.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds and alkenylcyclohexylbenzonitrile compounds. Not only the low-molecular-weight, liquid-crystalline compound as listed in the above, high-molecular-weight, liquid-crystalline compound may also be applicable.

High-molecular-weight liquid-crystalline compounds may be obtained by polymerizing low-molecular-weight liquid-crystalline compounds having at least one polymerizable group. Among such low-molecular-weight liquid-crystalline compounds, liquid-crystalline compounds represented by a formula (I) are preferred.

$Q^1$-$L^1$-$A^1$-$L^3$-M-$L^4$-$A^2$-$L^2$-$Q^2$  Formula (I):

In the formula, $Q^1$ and $Q^2$ respectively represent a polymerizable group. $L^1$, $L^2$, $L^3$ and $L^4$ respectively represent a single bond or a divalent linking group, and it is preferred that at least one of $L^3$ and $L^4$ represents —O—CO—O—. $A^1$ and $A^2$ respectively represent a $C_{2-20}$ spacer group. M represents a mesogen group.

In formula (I), $Q^1$ and $Q^2$ respectively represent a polymerizable group. The polymerization reaction of the polymerizable group is preferably addition polymerization (including ring opening polymerization) or condensation polymerization. In other words, the polymerizable group is preferably a functional group capable of addition polymerization reaction or condensation polymerization reaction. Examples of polymerizable groups are shown below.

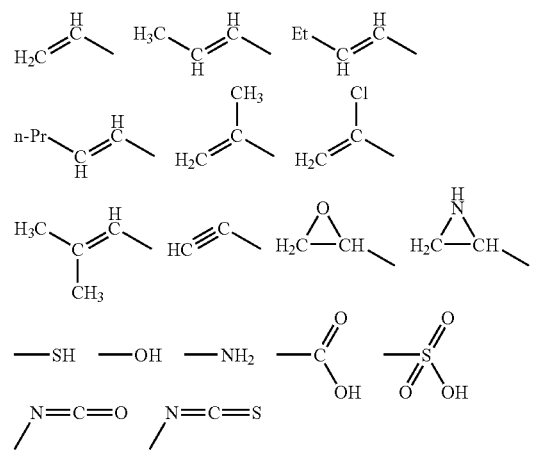

$L^1$, $L^2$, $L^3$ and $L^4$ independently represent a divalent linking group, and preferably represent a divalent linking group selected from the group consisting of —O—, —S—, —CO—, —NR²—, —CO—O—, —O—CO—O—, —CO—NR²—, —NR²—CO—, —O—CO—, —O—CO—NR²—, —NR²—CO—O— and —NR²—CO—NR²—. $R^{12}$ represents a $C_{1-7}$ alkyl group or a hydrogen atom. It is preferred that at least one of $L^1$ and $L^4$ represents —O—CO—O— (carbonate group). It is preferred that $Q^1$-$L^1$ and $Q^2$-$L^2$- are respectively $CH_2$=CH—CO—O—, $CH_2$=C($CH_3$)—

CO—O— or CH$_2$=C(Cl)—CO—O—CO—O—; and it is more preferred they are respectively CH$_2$=CH—CO—O—.

In the formula, A$^1$ and A$^2$ preferably represent a C$_{2-20}$ spacer group. It is more preferred that they respectively represent C$_{2-12}$ aliphatic group, and much more preferred that they respectively represent a C$_{2-12}$ alkylene group. The spacer group is preferably selected from chain groups and may contain at least one unadjacent oxygen or sulfur atom. And the spacer group may have at least one substituent such as a halogen atom (fluorine, chlorine or bromine atom), cyano, methyl and ethyl.

Examples of the mesogen represented by M include any known mesogen groups. The mesogen groups represented by a formula (II) are preferred.

   Formula (II):

In the formula, W$^1$ and W$^2$ respectively represent a divalent cyclic aliphatic group or a divalent hetero-cyclic group; and L$^5$ represents a single bond or a linking group. Examples of the linking group represented by L$^5$ include those exemplified as examples of L$^1$ to L$^4$ in the formula (I) and —CH$_2$—O— and —O—CH$_2$—. In the formula, n is 1, 2 or 3.

Examples of W$^1$ and W$^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. 1,4-cyclohexanediyl has two stereoisomers, cis-trans isomers, and the trans isomer is preferred. W$^1$ and W$^2$ may respectively have at least one substituent. Examples the substituent include a halogen atom such as a fluorine, chlorine, bromine or iodine atom; cyano; a C$_{1-10}$ alkyl group such as methyl, ethyl and propyl; a C$_{1-10}$ alkoxy group such as methoxy and ethoxy; a C$_{1-10}$ acyl group such as formyl and acetyl; a C$_{2-10}$ alkoxycarbonyl group such as methoxy carbonyl and ethoxy carbonyl; a C$_{2-10}$ acyloxy group such as acetyloxy and propionyloxy; nitro, trifluoromethyl and difluoromethyl.

Preferred examples of the basic skeleton of the mesogen group represented by the formula (II) include, but not to be limited to, these described below. And the examples may have at least one substituent selected from the above.

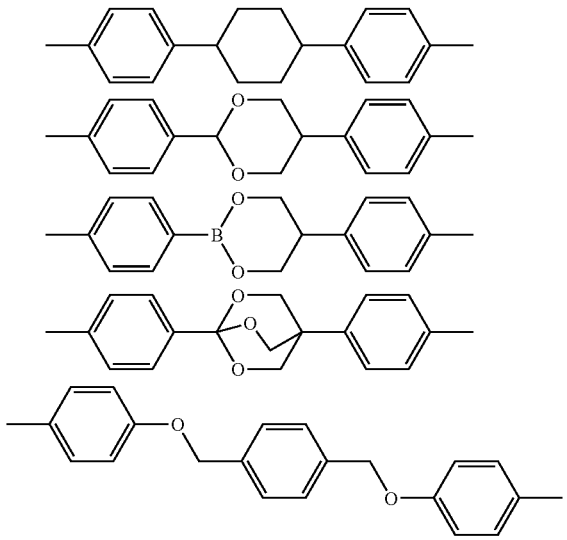

-continued

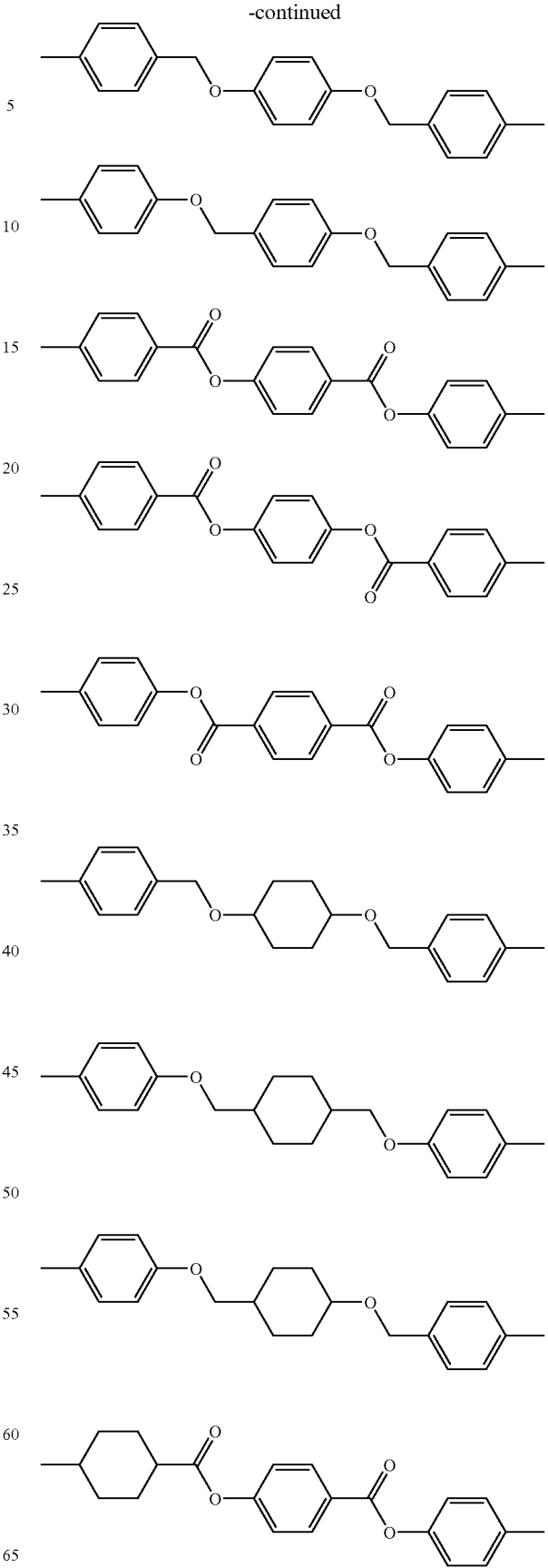

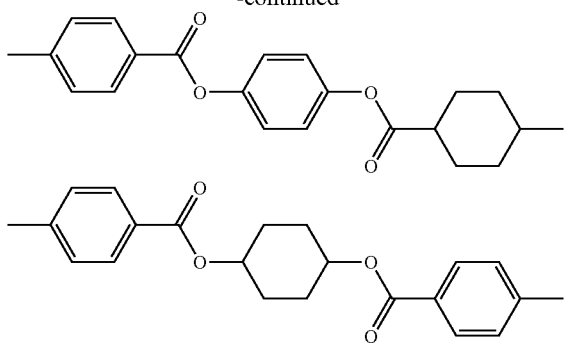
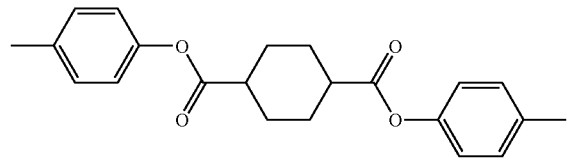
Examples the compound represented by the formula (I) include, but not to be limited to, these described below. The compounds represented by the formula (I) may be prepared according to a method described in a gazette of Tokkohyo No. hei 11-513019.
I-1
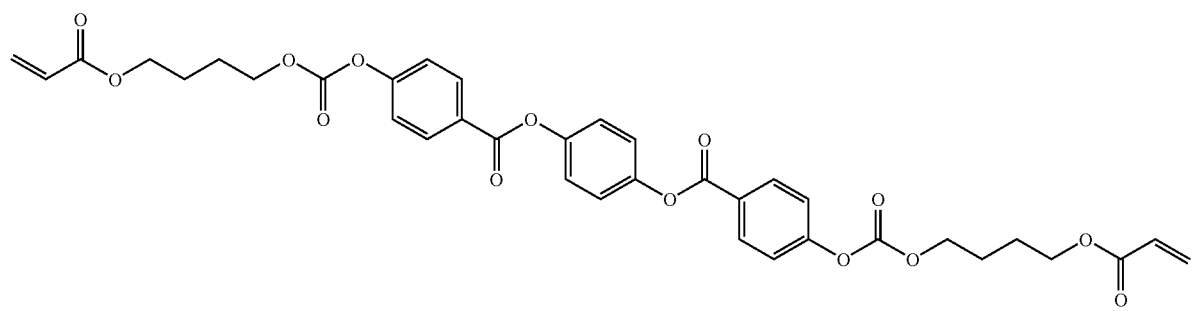
I-2
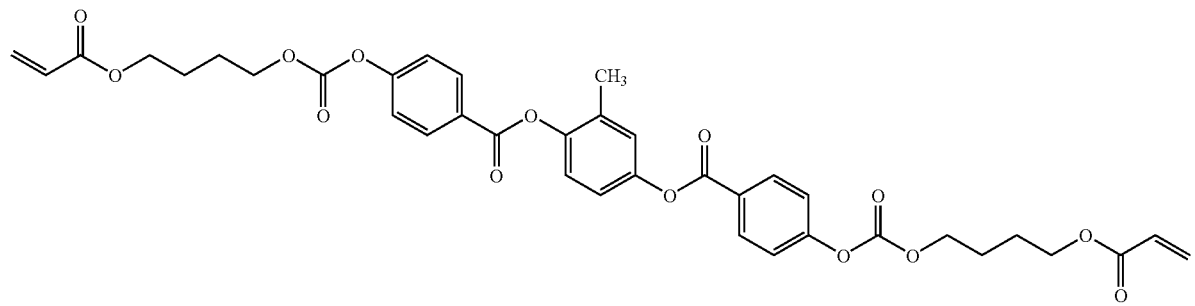
I-3
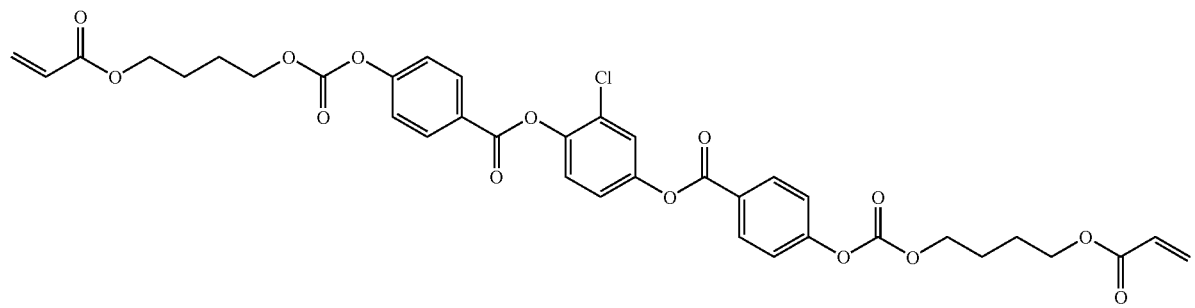

I-4
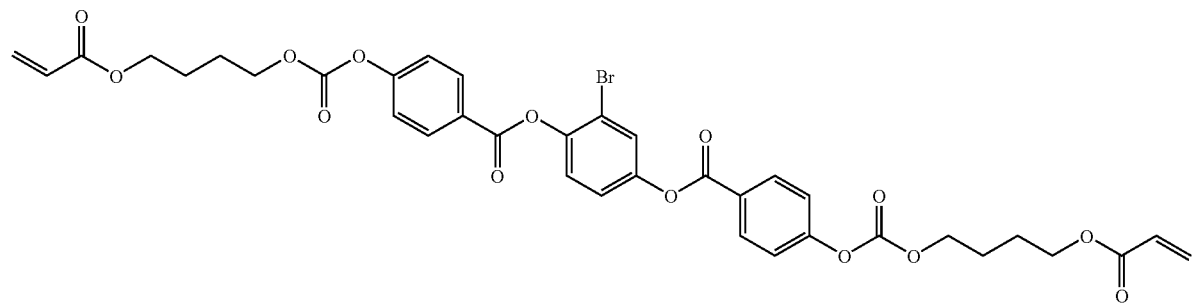
I-5
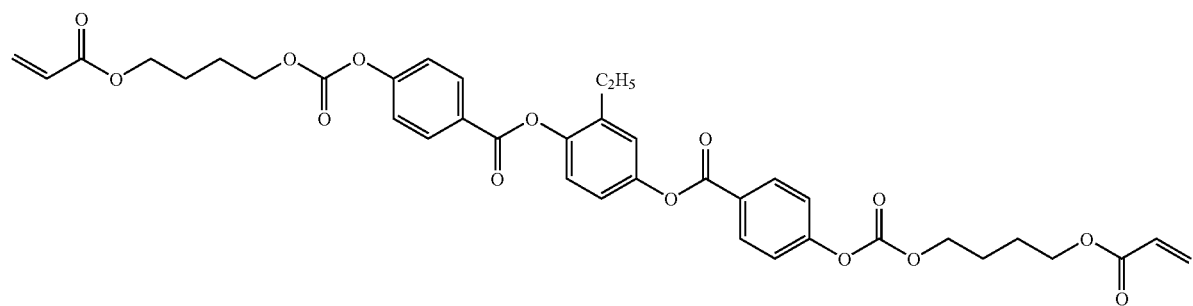
I-6
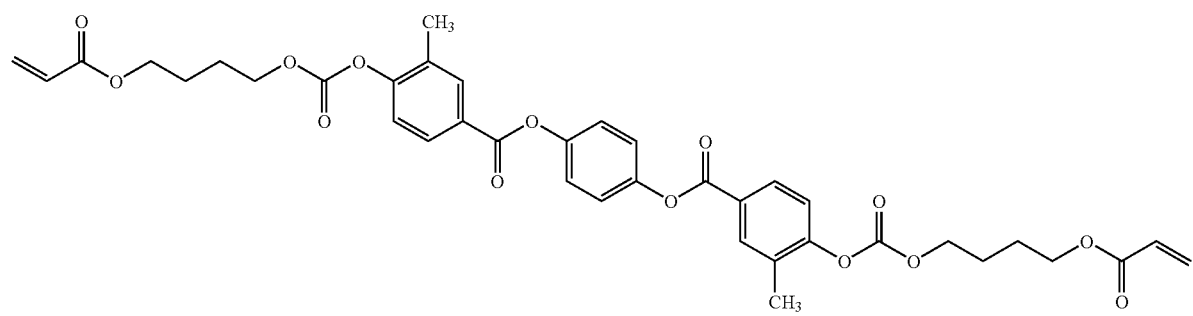
I-7
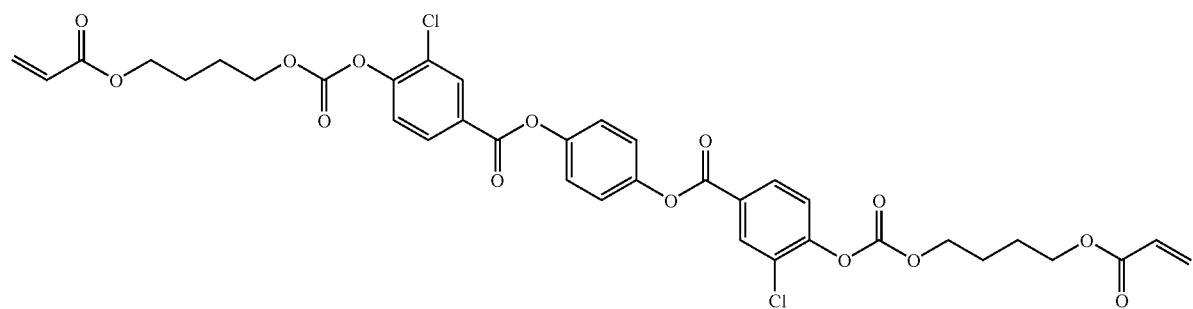
I-8
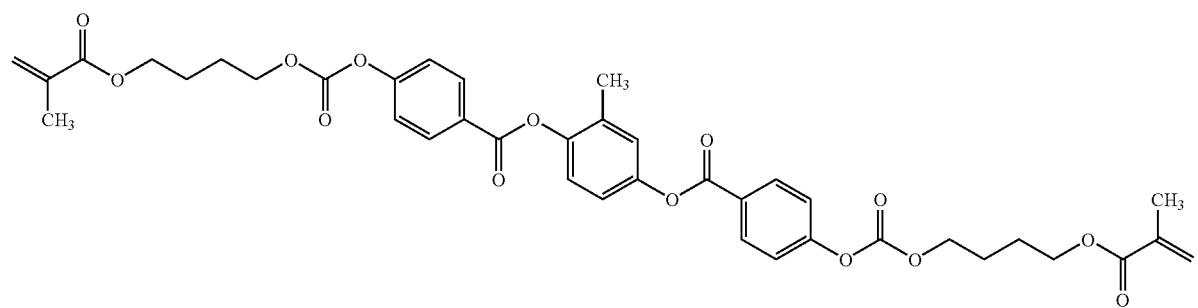

-continued
I-9
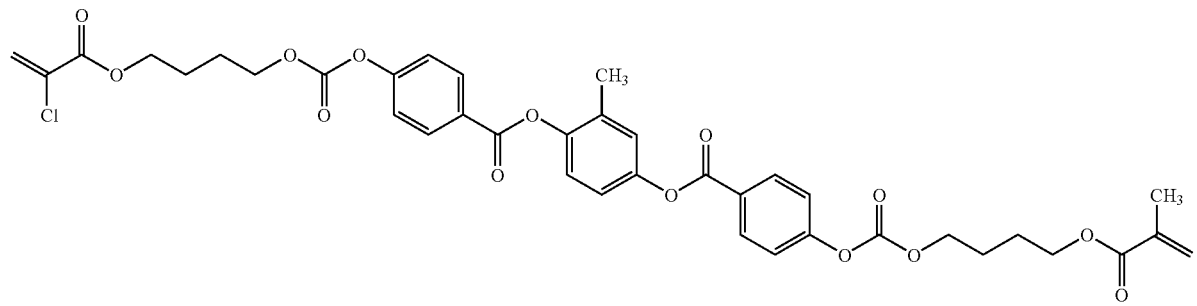
I-10
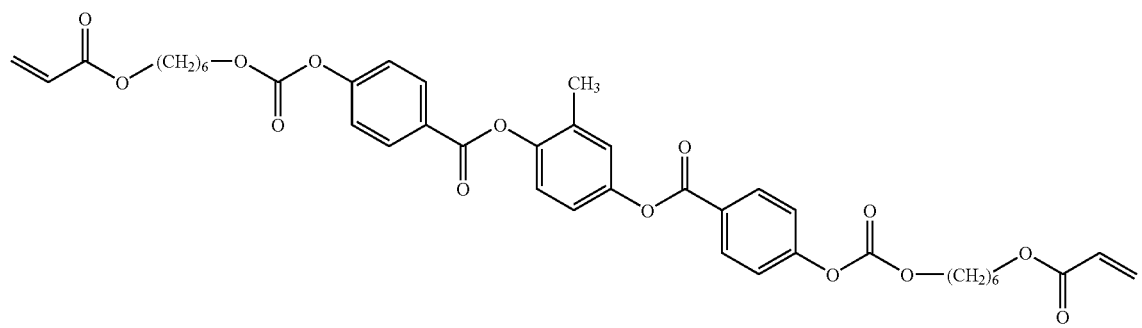
I-11
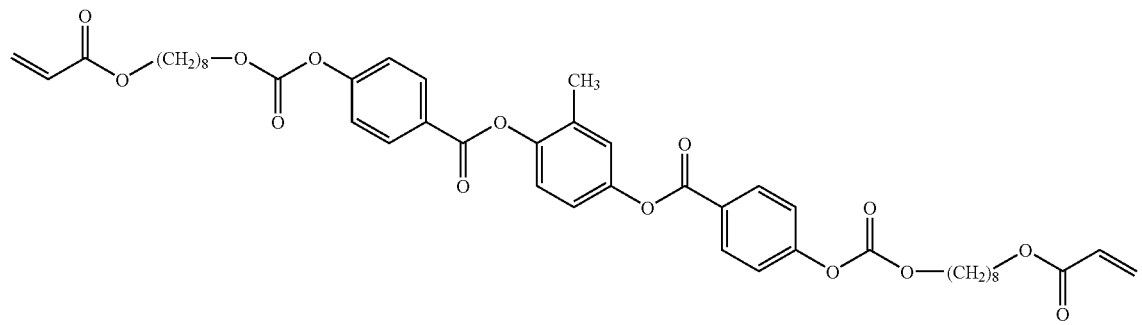
I-12
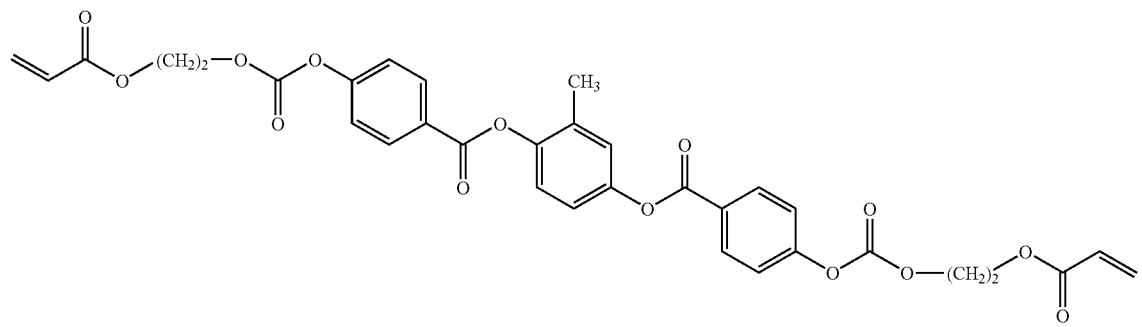

-continued
I-13
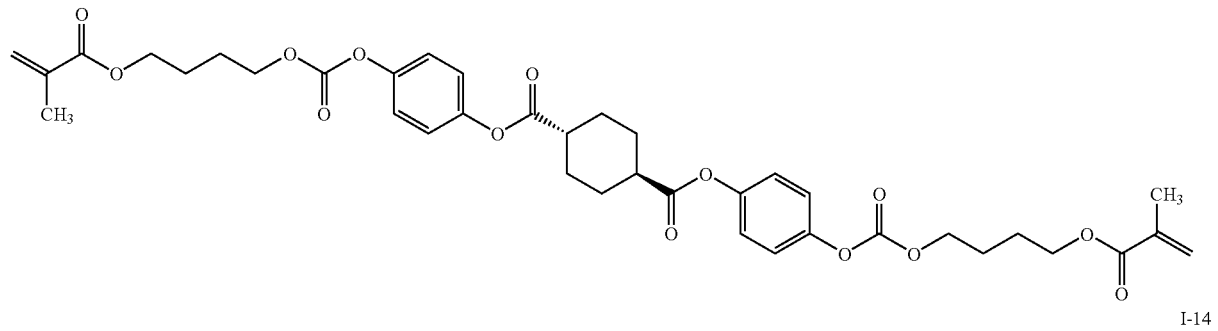
I-14
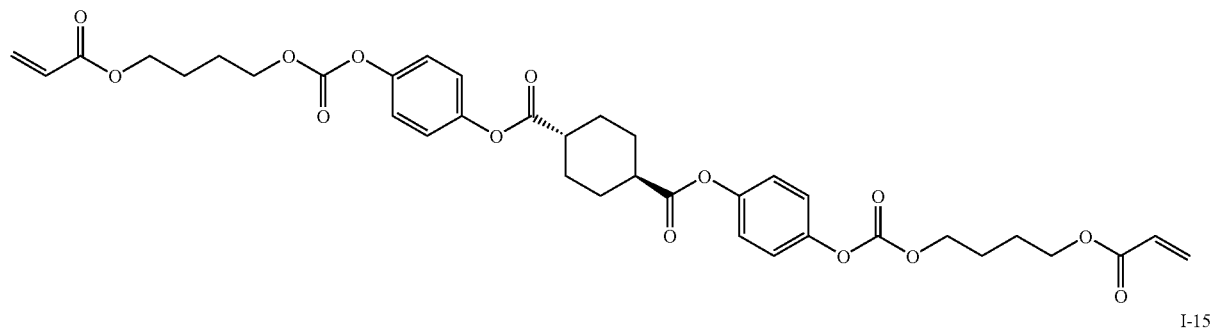
I-15
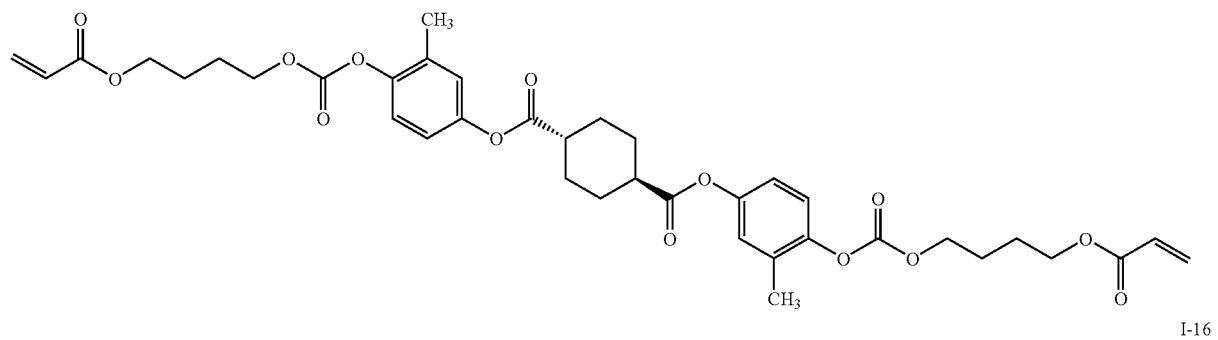
I-16
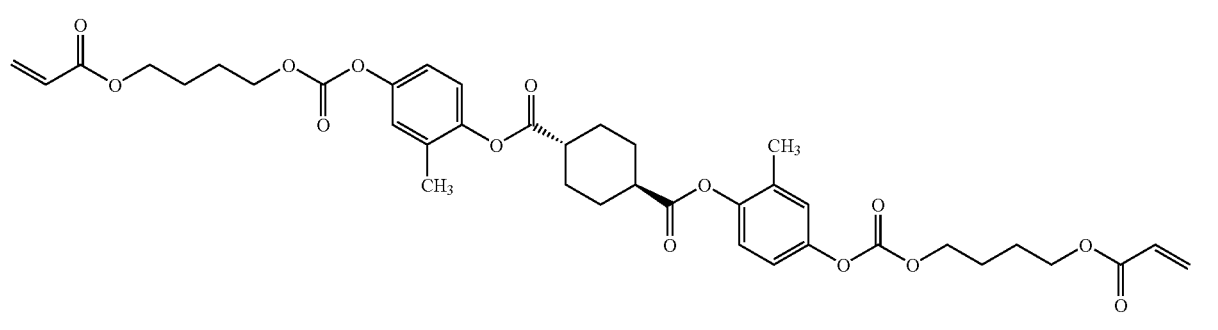
I-17
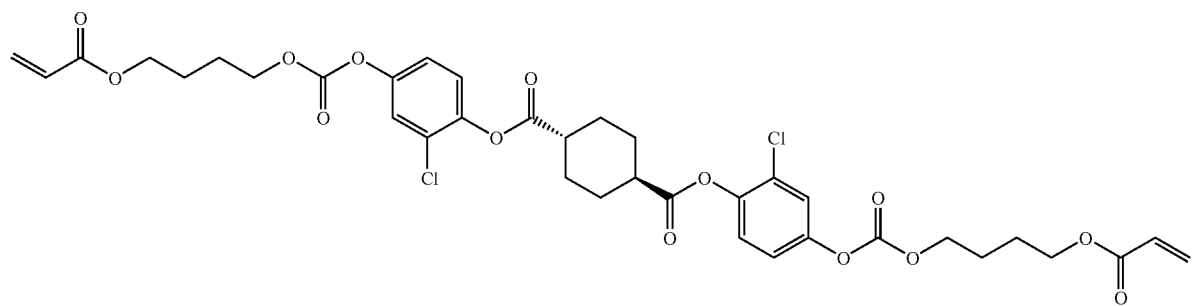

I-18

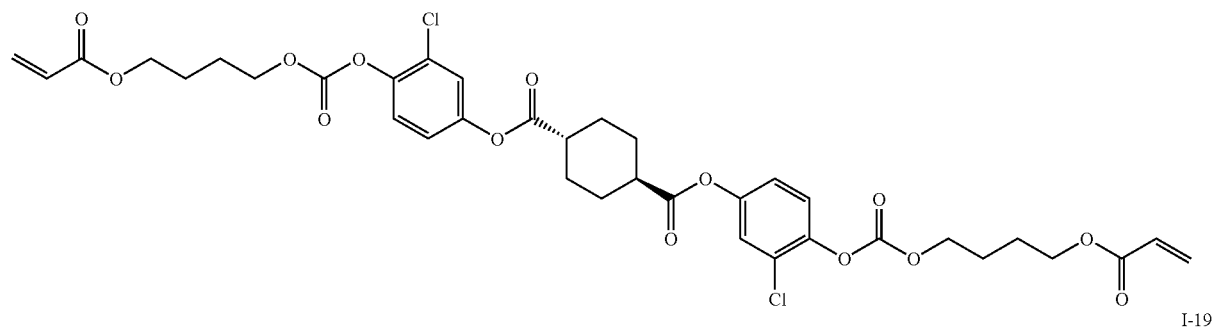

I-19

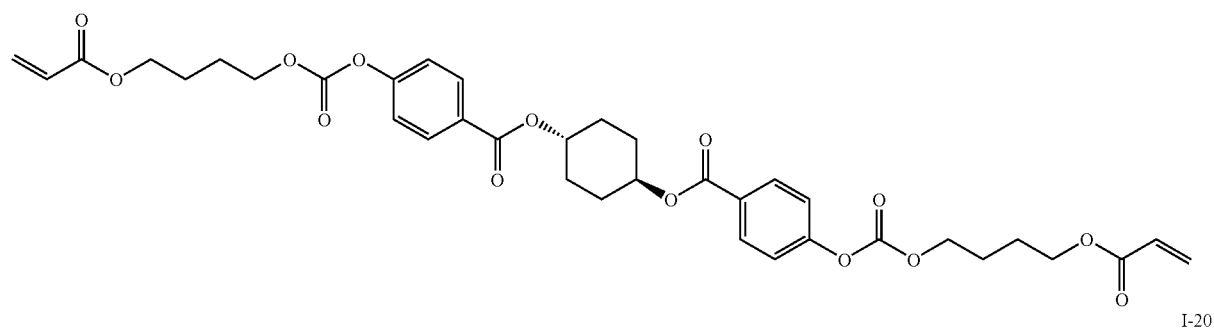

I-20

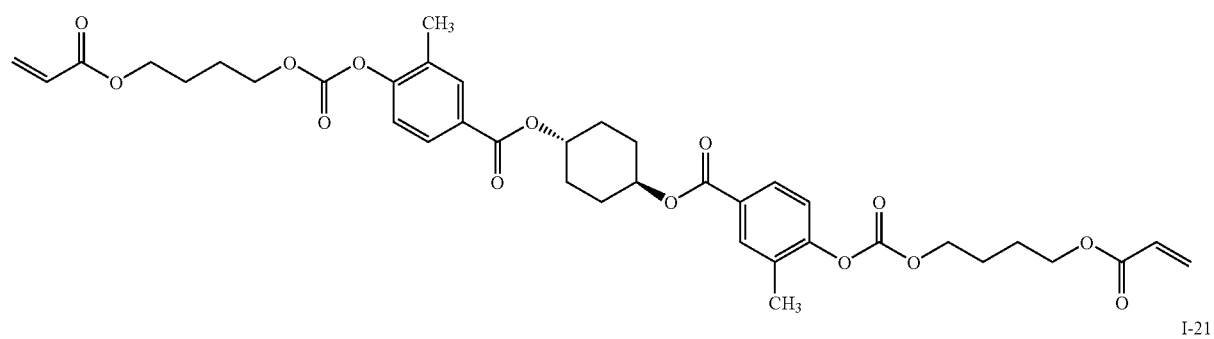

I-21

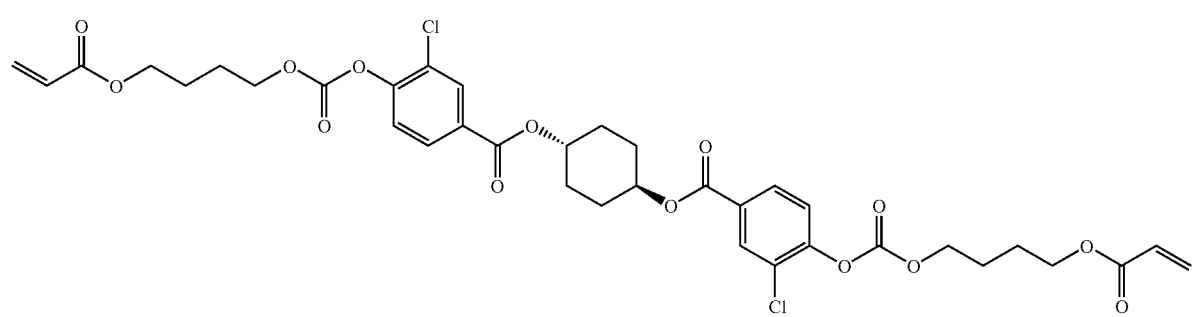

As described above, according to the present invention, discotic liquid-crystalline compounds are also preferably used. Examples of the discotic liquid-crystalline compound, which can be used in the first embodiment, are described in various documents, and include benzene derivatives described in C. Destrade et al., Mol. Cryst., Vol. 171, p. 111 (1981); torxene derivatives described in C. Destrade et al., Mol. Cryst., Vol. 122, p. 141 (1985) and Physics Lett., A, Vol. 78, p. 82 (1990); cyclohexane derivatives described in B. Kohne et al., Angew. Chem., Vol. 96, p. 70 (1984); and aza-crown-base or phenylacetylene-base macrocycles described in J. M. Lehn, J. Chem. Commun., p. 1794 (1985) and in J. Zhang et al., J. Am. Chem. Soc., Vol. 116, p. 2655 (1994). The above mentioned discotic (disk-like) compounds generally have a discotic core in a central portion and groups (L), such as linear alkyl or alkoxy groups or substituted banzoyloxy groups, which radiate from the core. Among them, there are compounds exhibiting liquid crystallinity, and such compounds are generally called as discotic liquid crystal. When such molecules are aligned uniformly, the aggregate of the aligned molecules may exhibit an optically negative uniaxial property.

In the specification, the term of "formed of a discotic compound" is used not only when finally comprising the discotic compound as a low-molecular weight compound, but also when finally comprising a high-molecular weight discotic compound, no longer exhibiting liquid crystallinity, formed by carrying out crosslinking reaction of the low-molecular weight discotic compound having at least one reactive group capable of thermal reaction or photo reaction under heating or under irradiation of light.

According to the present invention, it is preferred that the discotic liquid-crystalline compound is selected from the formula (III) below:

$$D(-L-P)_n \qquad \text{Formula (III):}$$

In the formula, D represents a discotic core, L represents a divalent linking group, P represents a polymerizable group, and n is an integer from 4 to 12.

Preferred examples of the discotic core (D), the divalent linking group (L) and the polymerizable group (P) are respectively (D1) to (D15), (L1) to (L25) and (P1) to (P18) described in Japanese Laid-Open Patent Publication (Tokkai) No. 2001-4837; and the descriptions regarding the discotic core (D), the divalent linking group (L) and the polymerizable group (P) may be preferably applicable to this embodiment.

Preferred examples of the discotic compound are shown below.

TE-1

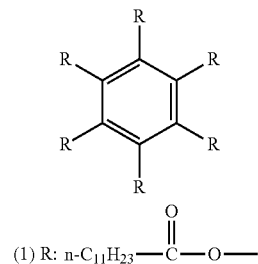

(1) R: n-$C_{11}H_{23}$—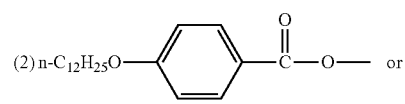

(2) n-$C_{12}H_{25}$O—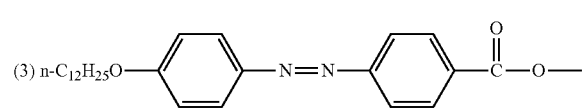 or (3) n-$C_{12}H_{25}$O—

TE-2

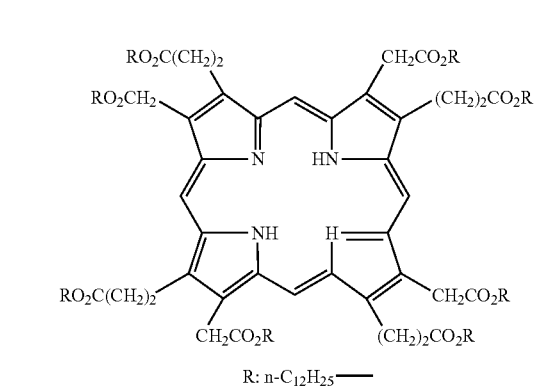

R: n-$C_{12}H_{25}$—

TE-3

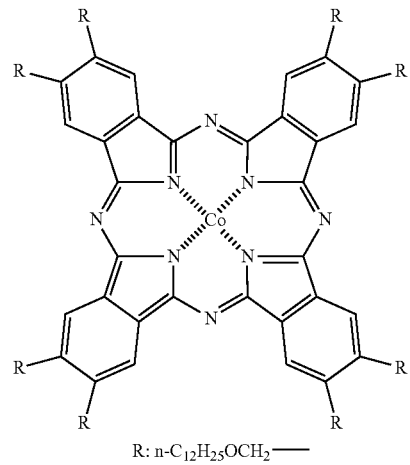

R: n-$C_{12}H_{25}OCH_2$—

TE-4

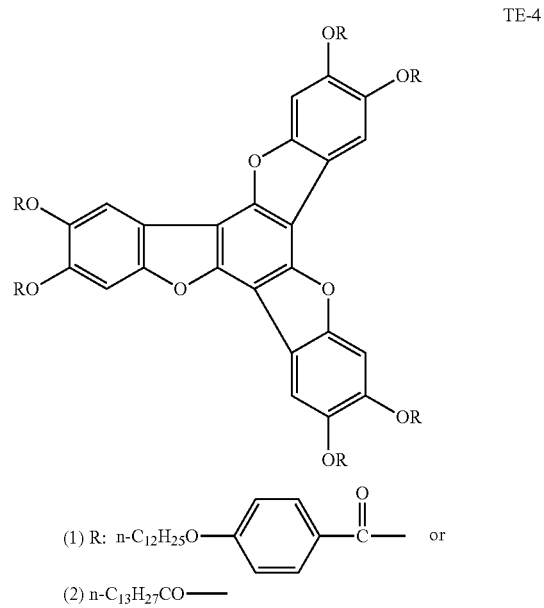

(1) R: n-$C_{12}H_{25}$O—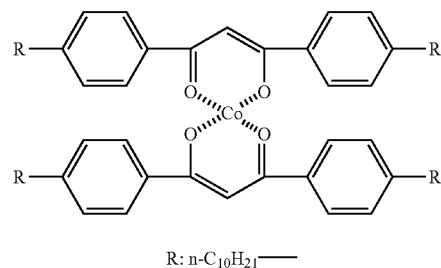 or (2) n-$C_{13}H_{27}$CO—

TE-5

R: n-$C_{10}H_{21}$—

TE-6

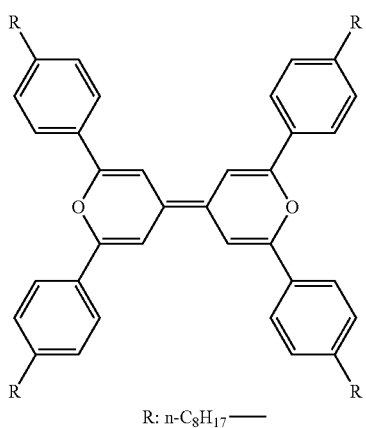

R: n-C₈H₁₇—

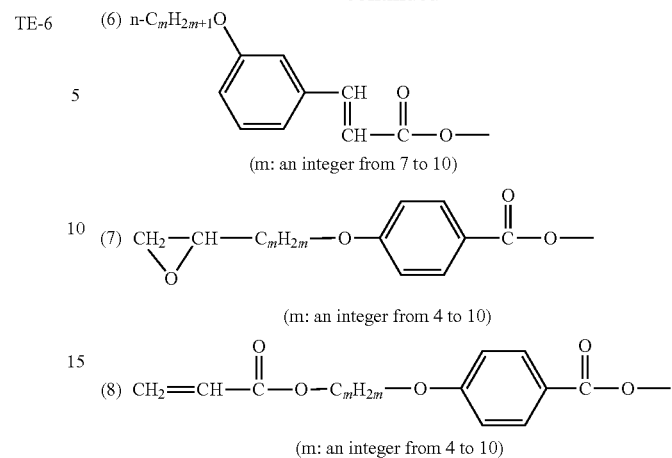

(6) n-C$_m$H$_{2m+1}$O—[structure]
(m: an integer from 7 to 10)

(7) CH$_2$—CH—C$_m$H$_{2m}$—O—[structure]
(m: an integer from 4 to 10)

(8) CH$_2$=CH—C(O)—O—C$_m$H$_{2m}$—O—[structure]
(m: an integer from 4 to 10)

TE-7

[tetrathiafulvalene structure]

R: n-C₁₆H₃₃O—

TE-8

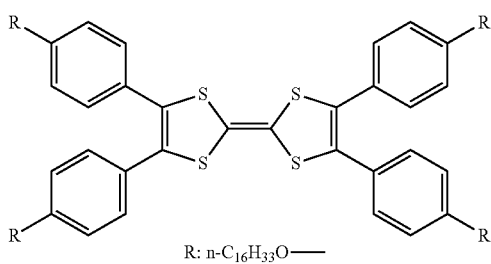

(1) n-C$_m$H$_{2m+1}$O—
(m: an integer from 2 to 5)

(2) n-C₈H₁₇—C(O)—O—

(3) n-C₈H₁₇O—[benzoate]—C(O)—O—

(4) n-C₇H₁₅O—[benzoate]—C(O)—O—

(5) n-C₅H₁₁O—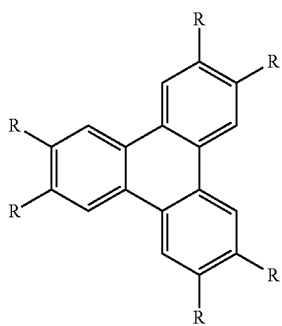

TE-9

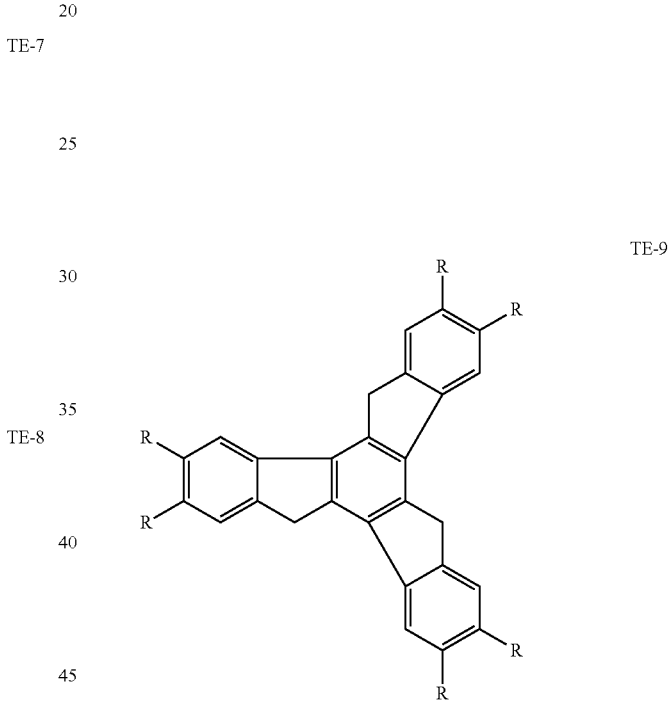

R: (1) n-C₁₆H₂₁C(O)—O—

(2) n-C₁₆H₃₃O—[benzoate]—C(O)—O—

(3) CH₃O—[phenyl]—NHCO(CH₂)₈C(O)—O—

-continued

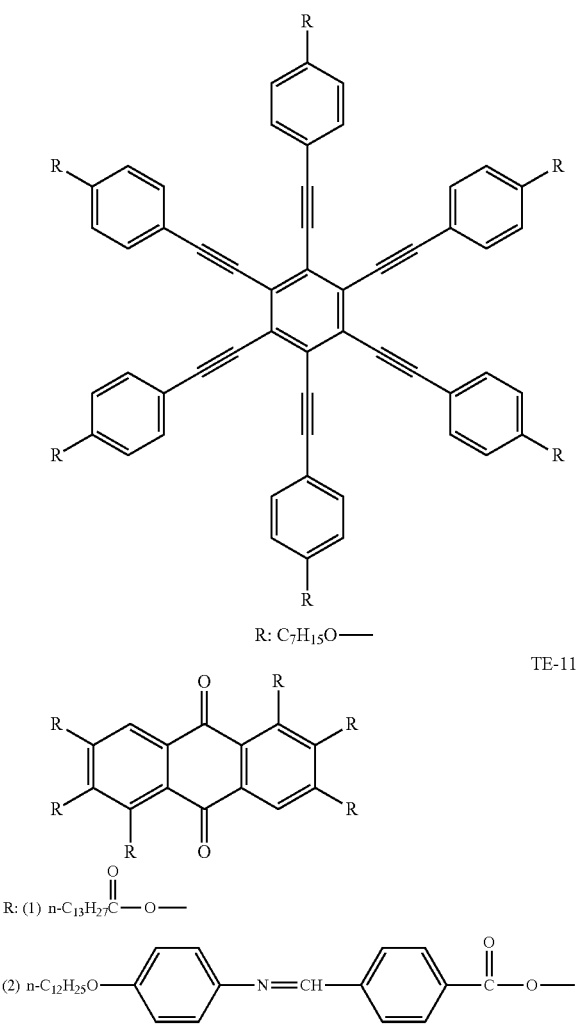

TE-10

R: $C_7H_{15}O-$

TE-11

R: (1) n-$C_{13}H_{27}\overset{O}{\overset{\|}{C}}-O-$ (2) n-$C_{12}H_{25}O-$⟨⟩$-N=CH-$⟨⟩$-\overset{O}{\overset{\|}{C}}-O-$ The optically anisotropic layer may be formed according to a process comprising applying a composition (for example a coating liquid) comprising at least on liquid crystalline compound to a surface of an alignment layer, described in detail later, aligning liquid crystalline molecules as to show a liquid crystal phase, and fixing the liquid crystal phase under heating or light-irradiating. The optically anisotropic layer exhibiting optical biaxiality may exactly compensate a liquid crystal cell, in particular a VA-mode liquid crystal cell. Using a rod-like liquid-crystalline compound to form a film exhibiting optical biaxiality, it is necessary to align rod-like molecules in a twisted cholesteric orientation, or in a twisted hybrid cholesteric orientation in which the tilt angles of the molecules are varied gradually in the thickness-direction, and then to distort the twisted cholesteric orientation or the twisted hybrid cholesteric orientation by irradiation of polarized light. Examples of the method for distorting the orientation by the polarized light irradiation include a method of using a dichroic liquid-crystalline polymerization initiator (EP1389199A1), and a method of using a rod-like liquid-crystalline compound having in the molecule thereof a photo-alignable functional group such as cinnamoyl group (Japanese Laid-Open Patent Publication "Tokkai" No. 2002-6138). The present invention can adopt any of these methods.

The optically anisotropic layer exhibiting optical uniaxiality may exactly compensate a liquid crystal cell, in particular a VA-mode, IPS mode or semi-transmissive mode liquid crystal cell, in combination with either of the protective films of upper or lower side polarizing plates, of which optical anisotropy is optimized. In either case, with respect to improvement in the viewing angle dependence of color, which is the purpose of the present invention, the liquid crystal cell can optically be compensated in an exact manner over a wide wavelength range, because the wavelength dispersion of retardation of the polarizer plate protective film is generalized, that is, the retardation reduces as the wavelength increases. The optically anisotropic layer as the polarizer plate protective film is preferably an optically biaxial film, in which the minimum refractive index is found in a thickness direction, or c-plate for a VA mode; is preferably an optically biaxial film in which the minimum refractive index is found in a thickness direction for an IPS mode; and is preferably an A-plate for a semi-transmissive mode. The optically anisotropic layer, exhibiting optical uniaxiality, included in the transfer material of the present invention may be produced by aligning uniaxial rod-like or discotic liquid crystalline molecules so that their directors are aligned uniaxially. Such uniaxial alignment can be created typically by a method of aligning a non-chiral liquid crystal on a rubbed alignment layer or on a photo-alignment layer, by a method of aligning liquid crystal with the aid of magnetic field or electric field, or by a method of aligning liquid crystal with applying external force such as stretching or shearing.

For the case where a discotic liquid crystalline compound having reactive groups is used as the liquid crystalline compound, in the layer, the discotic molecules may be fixed in any alignment state such as a horizontal alignment state, vertical alignment state, tilted alignment state and twisted alignment state. It is preferred that the molecules are fixed in a horizontal alignment state, a vertical alignment state and a twisted alignment state, and it is more preferred that the molecules fixed in a horizontal alignment state. The horizontal alignment means that the disc planes of the discotic liquid crystalline molecules compound are parallel to the horizontal plane of the support, which however does not demand strict parallelness in this specification, allowing with a tilt angle against the horizontal plane of less than 10°.

For the case where two or more optically anisotropic layers formed of the liquid-crystalline compositions are stacked in the present invention, there is no special limitation on combination of the liquid-crystalline compositions, so that the stack may be any of those formed of liquid-crystalline compositions all comprising discotic liquid-crystalline molecules, or formed of liquid-crystalline compositions all comprising rod-like liquid-crystalline molecules, or formed of liquid-crystalline compositions respectively comprising discotic liquid-crystalline molecules and rod-like liquid-crystalline molecules. There is no special limitation also on combination of orientation state of the individual layers, allowing stacking of the optically anisotropic layers having the same orientation status, or stacking of the optically anisotropic layer having different orientation states.

The optically anisotropic layer may be formed by applying a coating liquid, containing a liquid-crystalline compound and, if necessary, a polymerization initiator as described below or other additives, to a surface of an alignment layer, described in detail later. The solvent used for preparing the coating liquid is preferably an organic solvent. Examples of organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents may be used in combination.

[Fixing of Liquid-Crystalline Molecules in an Alignment State]

For producing the optical compensation sheet of the present invention, it is preferred that the liquid-crystalline molecules in an alignment state are fixed without disordering the state. Fixing is preferably carried out by the polymerization reaction of the polymerizable groups contained in the liquid-crystalline molecules. The polymerization reaction includes thermal polymerization reaction using a thermal polymerization initiator and photo-polymerization reaction using a photo-polymerization initiator. Photo-polymerization reaction is preferred. Examples of photo-polymerization initiators include alpha-carbonyl compounds (described in U.S. Pat. Nos. 2,367,661 and 2,367,670), acyloin ethers (described in U.S. Pat. No. 2,448,828), alpha -hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in Japanese Laid-Open Patent Publication (Tokkai) syo No. 60-105667 and U.S. Pat. No. 4,239,850) and oxadiazole compounds (described in U.S. Pat. No. 4,212,970).

The amount of the photo-polymerization initiators to be used is preferably 0.01 to 20% by weight, more preferably 0.5 to 5% by weight on the basis of solids in the coating liquid. Irradiation for polymerizing the liquid-crystalline molecules preferably uses UV rays. The irradiation energy is preferably 20 mJ/cm$^2$ to 10 J/cm$^2$, and more preferably 100 to 800 mJ/cm$^2$. Irradiation may be carried out in a nitrogen gas atmosphere and/or under heating to accelerate the photo-polymerization reaction.

[Orientation Induced by Irradiation of Polarized Light (Photoinduced Orientation)]

The optically anisotropic layer may exhibit in-plane retardation attributed to photoinduced orientation with the aid of polarized light irradiation. The polarized light irradiation may be carried out at the same time with photo-polymerization process in the fixation of orientation, or the polarized light irradiation may precede and then may be followed by non-polarized light irradiation for further fixation, or the non-polarized light irradiation for fixation may precede and the polarized light irradiation may succeed for the photoinduced orientation. For the purpose of obtaining a large retardation, it is preferable to carry out only the polarized light irradiation, or to carry out the polarized light irradiation first. The polarized light irradiation is preferably carried out under an inert gas atmosphere having an oxygen concentration of 0.5% or below. The irradiation energy is preferably 20 mJ/cm$^2$ to 10 J/cm$^2$, and more preferably 100 to 800 mJ/cm$^2$. The luminance is preferably 20 to 1000 mW/cm$^2$, more preferably 50 to 500 mW/cm$^2$, and still more preferably 100 to 350 mW/cm$^2$. There is no special limitation on types of the liquid-crystalline molecule to be hardened by the polarized light irradiation, wherein the liquid-crystalline molecule having an ethylenic unsaturated group as the reactive group is preferable. It is preferred that the irradiation light to be used has a peak falling within the range from 300 to 450 nm, more preferred from 350 to 400 nm.

The optically anisotropic layer exhibiting in-plane retardation attributed to the photoinduced orientation with the aid of the polarized light irradiation is excellent in particular for optical compensation of VA-mode liquid crystal display device.

[Post-Curing with UV-Light Irradiation after Irradiation of Polarized Light]

After the first irradiation of polarized light for photoinduced orientation, the optically anisotropic layer may be irradiated with polarized or non-polarized light so as to improve the reaction rate (post-curing step). As a result, the adhesiveness is improved and, thus, the optically anisotropic layer may be produced with larger feeding speed. The post-curing step may be carried out with polarized or non-polarized light, and preferably with polarized light. Two or more steps of post-curing are preferably carried out with only polarized light, with only non-polarized light or with combination of polarizing and non-polarized light. With combination of polarizing and non-polarized light, irradiating with polarized light previous to irradiating with non-polarized light is preferred. The irradiation of UV light may be carried out under an inert gas atmosphere, and preferably under an inert gas atmosphere where the oxygen gas concentration is 0.5% or below. The irradiation energy is preferably 20 mJ/cm$^2$ to 10 J/cm$^2$, and more preferably 100 to 800 mJ/cm$^2$. The luminance is preferably 20 to 1000 mW/cm$^2$, more preferably 50 to 500 mW/cm$^2$, and still more preferably 100 to 350 mW/cm$^2$. It is preferred that the irradiation polarized light to be used has a peak falling within the range from 300 to 450 nm, more preferred from 350 to 400 nm. It is also preferred that the irradiation non-polarized light to be used has a peak falling within the range from 200 to 450 nm, more preferred from 250 to 400 nm.

For the case where the transfer material of the present invention is transferred onto the substrate of the liquid crystal cell to thereby form an optically anisotropic layer and a color filter, optical characteristics of the optically anisotropic layer is preferably adjusted to those optimized for optical compensation upon being illuminated by R light, G light and B light. More specifically, it is preferable to optimize the optical characteristics of the optically anisotropic layer for optical compensation upon being illuminated by the R light if the photosensitive polymer layer is colored in red for use as an R layer of the color filter; to optimize the optical characteristics of the optically anisotropic layer for optical compensation upon being illuminated by the G light if the photosensitive polymer layer is colored in green; and to optimize the optical characteristics of the optically anisotropic layer for optical compensation upon being illuminated by the B light if the photosensitive polymer layer is colored in blue. The optical characteristics of the optically anisotropic layer can be adjusted within a desirable range typically based on types of the liquid crystalline compound, types of the alignment aid agent, amount of addition thereof, types of the alignment layer, rubbing conditions for the alignment layer, and conditions for illuminating polarized light.

At least one compound represented by a formula (1), (2) or (3) shown below may be added to the composition used for forming the optically anisotropic layer may comprise, in order to promote aligning the liquid-crystalline molecules horizontally. It is to be noted that the term "planar alignment" means that, regarding rod-like liquid-crystalline molecules, the molecular long axes thereof and a layer plane are parallel to each other, and, regarding discotic liquid-crystalline molecules, the disk-planes of the cores thereof and a layer plane are parallel to each other. However, they are not required to be exactly parallel to each other, and, in the specification, the term "planar alignment" should be understood as an alignment state in which molecules are aligned with a tilt angle against a layer plane less than 10 degree. The tilt angle is preferably from 0 to 5 degree, more preferably 0 to 3 degree, much more preferably from 0 to 2 degree, and most preferably from 0 to 1 degree.

The formula (1) to (3) will be described in detail below.

Formula (1)

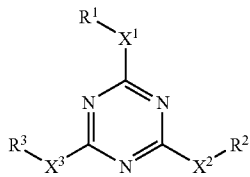

In the formula, $R^1$, $R^2$ and $R^3$ respectively represent a hydrogen atom or a substituent; and $X^1$, $X^2$ and $X^3$ respectively represent a single bond or a divalent linking group.

Formula (II)

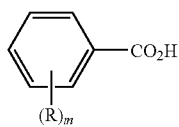

In the formula, R represents a substituent, m is an integer from 0 to 5. When m is 2 or more, plural R are same or different each other.

Formula (3)

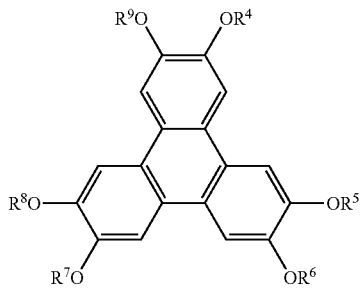

In the formula, $R^4$, $R^5$, $R^6$, $R^7$, $R^8$ and $R^9$ respectively represent a hydrogen atom or a substituent.

Examples of the planar alignment agent, which can be used in the present invention, include those described in Japanese Laid-Open Patent Publication (Tokkai) No. 2005-099248 and the methods for preparing such compounds are described in the document.

The amount of the compound represented by the formula (1), (2) or (3) is preferably from 0.01 to 20 weight %, more preferably from 0.01 to 10 weight % and much more preferably from 0.02 to 1 weight %. One type compound may be selected from the formula (1), (2) or (3) and used singly, or two or more type of compounds may be selected from the formula (1), (2) or (3) and used in combination.

[Alignment Layer]

An alignment layer may be used for forming the optically anisotropic layer. The alignment layer may be generally formed on a surface of the support or a surface of an undercoating layer formed on the support. The alignment layer has ability of controlling the alignment of liquid crystalline molecules thereon, and, as far as having such ability, may be selected from various known alignment layers. The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

Examples of the organic compound, which can be used for forming the alignment layer, include polymers such as polymethyl methacrylate, acrylic acid/methacrylic acid copolymer, styrene/maleimide copolymer, polyvinyl alcohol, poly (N-methyrol acrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonates; and silane coupling agents. Preferred exampled of the polymer include polyimide, polystyrene, styrene based polymers, gelatin, polyvinyl alcohol and alkyl-modified polyvinyl alcohol having at least one alkyl group (preferably $C_6$ or longer alkyl group).

In the present invention, it is preferable to use, as an alignment layer, a polymer layer. The types of polymer, which is used for forming the alignment layer, may be decided depending on what types of alignment state of liquid crystal (in particular how large of tilt angle) is preferred. For forming an alignment layer capable of aligning liquid crystalline molecules horizontally, it is required not to lower the surface energy of the alignment layer, and polymer may be selected from typical polymers have been used for alignment layers. Examples of such polymer are described in various documents concerning liquid crystal cells or optical compensation sheets. Polyvinyl alcohols, modified polyvinyl alcohols, poly acrylic acid, acrylic acid/acrylate copolymers, polyvinyl pyrrolidone, cellulose and modified cellulose are preferably used. Materials used for producing the alignment layer may have at least one functional group capable of reacting with the reactive group of liquid crystalline compound in the optically anisotropic layer. Examples of the polymer having such s functional group include polymers having side chains comprising a repeating unit having such functional group, and polymers having a cyclic moiety substituted with such a functional group. It is more preferable to use an alignment layer capable of forming a chemical bond with the liquid-crystalline compound at the interface, and a particularly preferable example of such alignment layer is a modified polyvinyl alcohol, described in Japanese Laid-Open Patent Publication "Tokkaihei" No. 9-152509, which has an acrylic group introduced in the side chain thereof using acid chloride or Karenz MOI (product of Showa Denko K.K.). The thickness of the alignment layer is preferably 0.01 to 5 μm, and more preferably 0.05 to 2 μm.

Polyimide, preferably fluorine-containing polyimide, films, which have been used as an alignment layer for LCD, are also preferable. The film may be formed by applying poly(amic acid), provided, for example, as LQ/LX series products by Hitachi Chemical Co., Ltd or as SE series products by NISSAN CHEMICAL INDUSTRIES, LTD, to a surface of the support, heating at 100 to 300° C. for 0.5 to one hour to form a polymer layer, and rubbing a surface of the polymer layer.

The rubbing treatment may be carried out with known techniques which have been employed in the usual step for aligning liquid crystalline molecules of LCD. In particular, the rubbing treatment may be carried out by rubbing a surface of a polymer layer in a direction with paper, gauze, felt, rubber, nylon or polyester fiber or the like. The rubbing treatment may be carried out, for example, by rubbing a surface of a polymer layer in a direction at several times with a cloth having same length and same diameter fibers grafted uniformly.

Examples of the material used in oblique vapor deposition include metal oxides such as $SiO_2$, which is a typical material, $TiO_2$ and $ZnO_2$; fluorides such as $MgF_2$; metals such as Au and Al. Any high dielectric constant metal oxides can be used in oblique vapor deposition, and, thus, the examples thereof are not limited to the above mentioned materials. The inorganic oblique deposition film may be produced with a deposition apparatus. The deposition film may be formed on an immobile polymer film (a support) or on a long film fed continuously.

According to the present invention, the optically anisotropic layer may be produced on a temporal alignment layer, and may be transferred it onto the transparent support typically using a pressure-sensitive adhesive, but it is preferable that the process doesn't include such step, from the viewpoint of productivity.

[Photosensitive Polymer Layer]

The photosensitive polymer layer included in the transfer material of the present invention may be formed of a photosensitive polymer composition, for which either of positive type and negative type is acceptable so far as it can generate difference in transferability between the exposed region and non-exposed region after being irradiated by light through a mask or the like. The photosensitive polymer layer is preferably formed of a polymer composition comprising at least (1) an alkaline-soluble polymer, (2) a monomer or oligomer, and (3) a photopolymerization initiator or photopolymerization initiator system. In an embodiment in which the optically anisotropic layer is formed on the substrate at the same time with the color filter, it is preferable to use a colored polymer composition additionally comprising (4) a colorant such as dye or pigment.

These components (1) to (4) will be explained below.

(1) Alkali-Soluble Polymer

The alkali-soluble polymer (which may be referred simply to as "binder", hereinafter) is preferably a polymer having, in the side chain thereof, a polar group such as carboxylic acid groups or carboxylic salt. Examples thereof include methacrylic acid copolymer, acrylic acid copolymer, itaconic acid copolymer, crotonic acid copolymer, maleic acid copolymer, and partially-esterified maleic acid copolymer described in Japanese Laid-Open Patent Publication "Tokkaisho" No. 59-44615, Examined Japanese Patent Publication "Tokkosho" Nos. 54-34327, 58-12577 and 54-25957, Japanese Laid-Open Patent Publication "Tokkaisho" Nos. 59-53836 and 59-71048. Cellulose derivatives having on the side chain thereof a carboxylic acid group can also be exemplified. Besides these, also cyclic acid anhydride adduct of hydroxyl-group-containing polymer are preferably used. Particularly preferable examples include copolymer of benzyl(meth)acrylate and (meth)acrylic acid described in U.S. Pat. No. 4,139,391, and multi-system copolymer of benzyl(meth)acrylate and (meth)acrylic acid and other monomer. These binder polymers having polar groups may be used independently or in a form of composition comprising a general film-forming polymer. The content of the polymer generally falls in the range from 20 to 50% by weight, and more preferably from 25 to 45% by weight, of the total weight of the solid components contained in the polymer composition.

(2) Monomer or Oligomer

The monomer or oligomer used for the photosensitive polymer layer is preferably selected from compounds, having two or more ethylenic unsaturated double bonds, capable of causing addition polymerization upon being irradiated by light. As such monomer and oligomer, compounds having at least one ethylenic unsaturated group capable of addition polymerization, and having a boiling point of 100° C. or above under normal pressure can be exemplified. The examples include monofunctional acrylates and monofunctional methacrylates such as polyethylene glycol mono(meth)acrylate, polypropylene glycol mono(meth)acrylate and phenoxyethyl(meth)acrylate; multi-functional acrylate and multi-functional methacrylate, obtained by adding ethylene oxide or propylene oxide to multi-functional alcohols such as trimethylol propane and glycerin, and then converting them into (meth)acrylates, such as polyethylene glycol di(meth)acrylate, polypropylene glycol di(meth)acrylate, trimethylolethane triacrylate, trimethylolpropane tri(meth)acrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylol propane tri(acryloyloxypropyl)ether, tri(acryloyloxyethyl)isocyanurate, tri(acryloyloxyethyl)cyanurate, glycerin tri(meth)acrylate.

Additional examples of multi-functional acrylates and methacrylates include urethane acrylates such as those described in Examined Japanese Patent Publication "Tokkosho" Nos. 48-41708, 50-6034 and Japanese Laid-Open Patent Publication "Tokkaisho" No. 51-37193; polyester acrylates such as those described in Japanese Laid-Open Patent Publication "Tokkaisho" No. 48-64183, Examined Japanese Patent Publication "Tokkosho" Nos. 49-43191 and 52-30490; and epoxyacrylates which are reaction products of epoxy polymer and (meth)acrylic acid. Of these, trimethylolpropane tri(meth)acrylate, pentaerythritol tetra(meth)acrylate, dipentaerythritol hexa (meth)acrylate, dipentaerythritol penta(meth)acrylate are preferable.

Besides these, also "polymerizable compound B" described in the Japanese Laid-Open Patent Publication "Tokkaihei" No. 11-133600 are exemplified as the preferable examples.

These monomers or oligomers can be used independently or in combination of two or more species thereof. The content of the monomer or oligomer generally falls in the range from 5 to 50% by weight, and more preferably from 10 to 40% by weight, of the total weight of the solid components contained in the polymer composition.

(3) Photopolymerization Initiator or Photopolymerization Initiator System

The photopolymerization initiator or photopolymerization initiator system used for the photosensitive polymer layer can be exemplified by vicinal polyketaldonyl compounds disclosed in U.S. Pat. No. 2,367,660, acyloin ether compounds described in U.S. Pat. No. 2,448,828, aromatic acyloin compounds substituted by α-hydrocarbon described in U.S. Pat. No. 2,722,512, polynuclear quinone compounds described in U.S. Pat. Nos. 3,046,127 and 2,951,758, combination of triaryl imidazole dimer and p-aminoketone described in U.S. Pat. No. 3,549,367, benzothiazole compounds and trihalomethyl-s-triazine compounds described in Examined Japanese Patent Publication "Tokkosho" No. 51-48516, trihalomethyltriazine compounds described in U.S. Pat. No. 4,239,850, and trihalomethyl oxadiazole compounds described in U.S. Pat.

No. 4,212,976. Trihalomethyl-s-triazine, trihalomethyl oxadiazole and triaryl imidazole dimer are particularly preferable.

Besides these, "polymerization initiator C" described in Japanese Laid-Open Patent Publication "Tokkaihei" No. 11-133600 can also be exemplified as a preferable example.

Such photopolymerization initiator or photopolymerization initiator system may be used independently or in a form of mixture of two or more species, wherein it is particularly preferable to use two or more species. Use of at least two species of photopolymerization initiator makes it possible to improve the display characteristics, and in particular to reduce non-uniformity in the display.

The content of the photopolymerization initiator or the photopolymerization initiator system generally falls in the range from 0.5 to 20% by weight, and more preferably from 1 to 15% by weight, of the total weight of the solid components contained in the polymer composition.

(4) Colorant

The polymer composition may be added with any of known colorants (dyes, pigments). The pigment is desirably selected from known pigments capable of uniformly dispersing in the polymer composition, and that the grain size is adjusted to 0.1 μm or smaller, and in particular 0.08 μm or smaller.

The known dyes and pigments can be exemplified by pigments and so forth described in paragraph [0033] in Japanese Laid-Open Patent Publication "Tokkai" No. 2004-302015 and in column 14 of U.S. Pat. No. 6,790,568.

Of the above-described colorants, those preferably used in the present invention include (i) C.I.Pigment Red 254 for the colored polymer composition for R(red), (ii) C.I.Pigment Green 36 for the colored polymer composition for G(green), and (iii) C.I.Pigment Blue 15:6 for the colored polymer composition for B(blue). The above-described pigments may be used in combination.

Preferable examples of combination of the above-described pigments include combinations of C.I.Pigment Red 254 with C.I.Pigment Red 177, C.I.Pigment Red 224, C.I.Pigment Yellow 139 or with C.I.Pigment Violet 23; combinations of C.I.Pigment Green 36 with C.I.Pigment Yellow 150, C.I.Pigment Yellow 139, C.I.Pigment Yellow 185, C.I.Pigment Yellow 138 or with C.I.Pigment Yellow 180; and combinations of C.I.Pigment Blue 15:6 with C.I.Pigment Violet 23 or with C.I.Pigment Blue 60.

Contents of C.I.Pigment Red 254, C.I.Pigment Green 36 and C.I.Pigment Blue 15:6 in the combined pigments are preferably 80% by weight or more, and particularly preferably 90% by weight or more for C.I.Pigment Red 254; preferably 50% by weight or more, and particularly preferably 60% by weight or more for C.I.Pigment Green 36; and 80% by weight or more, and particularly preferably 90% by weight or more for C.I.Pigment Blue 15:6.

The pigments are preferably used in a form of dispersion liquid. The dispersion liquid may be prepared by adding a composition, preliminarily prepared by mixing the pigment and a pigment dispersant, to an organic solvent (or vehicle) described later for dispersion. The vehicle herein refers to a portion of medium allowing the pigments to disperse therein when the coating material is in a liquid state, and includes a liquidous portion (binder) binding with the pigment to thereby solidify a coated layerwand a component (organic solvent) dissolving and diluting the liquidous portion. There is no special limitation on dispersion machine used for dispersing the pigment, and any known dispersers described in "Ganryo no Jiten (A Cyclopedia of Pigments)", First Edition, written by Kunizo Asakura, published by Asakura Shoten, 2000, p. 438, such as kneader, roll mill, attoritor, super mill, dissolver, homomixer, sand mill and the like, are applicable. It is also allowable to finely grind the pigment based on frictional force, making use of mechanical grinding described on p. 310 of the same literature.

The colorant (pigment) used in the present invention preferably has a number-averaged grain size of 0.001 to 0.1 μm, and more preferably 0.01 to 0.08 μm. A number-averaged grain size of less than 0.001 μm makes the pigment more likely to coagulate due to increased surface energy, makes the dispersion difficult, and also makes it difficult to keep the dispersion state stable. A number-averaged grain size exceeding 0.1 μm undesirably causes pigment-induced canceling of polarization, and degrades the contrast. It is to be noted that the "grain size" herein means the diameter of a circle having an area equivalent to that of the grain observed under an electron microscope, and that the "number-averaged grain size" means an average value of such grain sizes obtained from 100 grains.

The contrast of the colored pixel can be improved by reducing the grain size of the dispersed pigment. Reduction in the grain size can be achieved by adjusting the dispersion time of the pigment dispersion liquid. Any known dispersion machine described in the above can be used for the dispersion. The dispersion time is preferably 10 to 30 hours, more preferably 18 to 30 hours, and most preferably 24 to 30 hours. A dispersion time of less than 10 hours may result in pigment-induced canceling of polarization due to large grain size of the pigment, and lowering in the contrast. On the other hand, a dispersion time exceeding 30 hours may increase the viscosity of the dispersion liquid, and may make the coating difficult. Difference in the contrast of two or more colored pixels can be suppressed to 600 or smaller, by adjusting the grain size to thereby achieve a desired contrast.

The contrast of the individual colored pixels of the color filter formed by using the above-described photosensitive polymer layer is preferably 2000 or larger, more preferably 2800 or larger, still more preferably 3000 or larger, and most preferably 3400 or larger. If the contrast of the individual colored pixels composing the color filter is less than 2000, images observed on the liquid crystal display device having the color filter incorporated therein generally give a whitish impression, which is not comfortable to watch, and is undesirable. Difference in the contrast among the individual colored pixels is preferably suppressed to 600 or smaller, more preferably 410 or smaller, still more preferably 350 or smaller, and most preferably 200 or smaller. A difference in the contrast of the individual pixels of 600 or smaller makes light leakage from the individual colored pixel portions in the black state not so largely different from each other, and this is desirable in terms of ensuring a good color balance in the black state.

In this specification, "contrast of the colored pixel" means the contrast individually evaluated for each of the colors R, G and B composing the color filter. A method of measuring the contrast is as follows. Polarizer plates are stacked on a sample to be measured on both sides thereof, while aligning the direction of polarization of the polarizer plates in parallel with each other, the sample is then illuminated by a back light from one polarizer plate side, and luminance Y1 of light transmitted through the other polarizer plate is measured. Next, the polarizer plates are orthogonally crossed, the sample is then illuminated by the back light from one polarizer plate sides, and luminance Y2 of light transmitted through the other is measured. The contrast is expressed as Y1/Y2 using thus obtained values of measurement. It is to be noted that the polarizer plates used for the contrast measurement are the same as those used for the liquid crystal display device using the color filter.

The color filter formed using the photosensitive polymer layer preferably contain an appropriate surfactant in such colored polymer composition, in view of effectively preventing non-uniformity in display (non-uniformity in color due to variation in the film thickness). Any surfactants are applicable so far as they are miscible with the photosensitive polymer composition. Surfactants preferably applicable to the present invention include those disclosed in paragraphs [0090] to [0091] in Japanese Laid-Open Patent Publication "Tokkai" No. 2003-337424, paragraphs [0092] to [0093] in Japanese Laid-Open Patent Publication "Tokkai" No. 2003-177522, paragraphs [0094] to [0095] in Japanese Laid-Open Patent Publication "Tokkai" No. 2003-177523, paragraphs [0096] to [0097] in Japanese Laid-Open Patent Publication "Tokkai" No. 2003-177521, paragraphs [0098] to [0099] in Japanese Laid-Open Patent Publication "Tokkai" No. 2003-177519, paragraphs [0100] to [0101] in Japanese Laid-Open Patent Publication "Tokkai" No. 2003-177520, paragraphs [0102] to [0103] in Japanese Laid-Open Patent Publication "Tokkaihei" No. 11-133600 and those disclosed as the invention in Japanese Laid-Open Patent Publication "Tokkaihei" No. 6-16684. In view of obtaining more larger effects, it is preferable to use any of fluorine-containing surfactants and/or silicon-base surfactants (fluorine-containing surfactant, or, silicon-base surfactant, and surfactant containing both of fluorine atom and silicon atom), or two or more surfactants selected therefrom, wherein the fluorine-containing surfactant is most preferable. For the case where the fluorine-containing surfactant is used, the number of fluorine atoms contained in the fluorine-containing substituents in one surfactant molecule is preferably 1 to 38, more preferably 5 to 25, and most preferably 7 to 20. Too large number of fluorine atoms is undesirable in view of degrading solubility in general fluorine-free solvents. Too small number of fluorine atoms is undesirable in view of failing in obtaining effects of improving the non-uniformity.

Particularly preferable surfactants can be those containing a copolymer which includes the monomers expressed by the formulae (a) and (b) below, having a ratio of mass of formula (a)/formula (b) of 20/80 to 60/40:

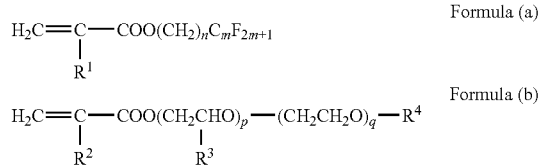

where, $R^1$, $R^2$ and $R^3$ independently represent a hydrogen atom or a methyl group, $R^4$ represents a hydrogen atom or an alkyl group having the number of carbon atoms of 1 to 5. n represents an integer from 1 to 18, and m represents an integer from 2 to 14. p and q represents integers from 0 to 18, excluding the case where both of p and q are 0.

It is to be defined now that a monomer expressed by the formula (a) and a monomer expressed by the formula (b) of the particularly preferable surfactants are denoted as monomer (a) and monomer (b), respectively. $C_mF_{2m+1}$ appears in the formula (a) may be straight-chained or branched. m represents an integer from 2 to 14, and is preferably an integer from 4 to 12. Content of $C_mF_{2m+1}$ is preferably 20 to 70% by weight, and more preferably 40 to 60% by weight, of the monomer (a). $R^1$ represents a hydrogen atom or a methyl group. n represents 1 to 18, and more preferably 2 to 10. $R^2$ and $R^3$ appear in the formula (b) independently represent a hydrogen atom or a methyl group, and $R^4$ represents a hydrogen atom or an alkyl group having the number of carbon atoms of 1 to 5. p and q respectively represent integers of 0 to 18, excluding the case where both of p and q are 0. p and q are preferably 2 to 8.

The monomer (a) contained in one particularly preferable surfactant molecule may be those having the same structure, or having structures differing within the above-defined range. The same will apply also to the monomer (b).

The weight-average molecular weight Mw of a particularly preferable surfactant preferably falls in the range from 1000 to 40000, and more preferably from 5000 to 20000. The surfactant characteristically contains a copolymer composed of the monomers expressed by the formula (a) and the formula (b), and having a ratio of mass of monomer (a)/monomer (b) of 20/80 to 60/40. Hundred parts by weight of a particularly preferable surfactant is preferably composed of 20 to 60 parts by weight of the monomer (a), 80 to 40 parts by weight of the monomer (b), and residual parts by weight of other arbitrary monomers, and more preferably 25 to 60 parts by weight of the monomer (a), 60 to 40 parts by weight of the monomer (b), and residual parts by weight of other arbitrary monomer.

Copolymerizable monomers other than the monomers (a) and (b) include styrene and derivatives or substituted compounds thereof including styrene, vinyltoluene, α-methylstyrene, 2-methylstyrene, chlorostyrene, vinylbenzoic acid, sodium vinylbenzene sulfonate, and aminostyrene; dienes such as butadiene and isoprene; and vinyl-base monomers such as acrylonitrile, vinylethers, methacrylic acid, acrylic acid, itaconic acid, crotonic acid, maleic acid, partially esterified maleic acid, styrene sulfonic acid, maleic anhydride, cinnamic acid, vinyl chloride and vinyl acetate.

A particularly preferable surfactant is a copolymer of the monomer (a), monomer (b) and so forth, allowing monomer sequence of random or ordered, such as forming a block or graft, while being not specifically limited. A particularly preferable surfactant can use two or more monomers differing in the molecular structure and/or monomer composition in a mixed manner.

Content of the surfactant is preferably adjusted to 0.01 to 10% by weight to the total amount of solid components of the photosensitive polymer layer, and more preferably to 0.1 to 7% by weight. The surfactant is such as containing predetermined amounts of a surfactant of a specific structure, ethylene oxide group and polypropylene oxide group, wherein addition thereof to an amount within a specific range to the photosensitive polymer layer makes it possible to improve non-uniformity in the display on the liquid crystal display device provided with the photosensitive polymer layer. A content of less than 0.01% by weight to the total amount of solid components fails in improving the non-uniformity in the display, and a content exceeding 10% by weight only results in an almost saturated effect of improving the non-uniformity in the display. Production of the color filter while adding the particularly preferable surfactant described in the above to the photosensitive polymer layer is preferable in terms of improving the non-uniformity in the display.

Specific examples of preferred fluorine-containing surfactant include the compounds described in paragraphs [0054] to [0063] of Japanese Laid-Open Patent Publication "Tokkai" No. 2004-163610. It is also allowable to directly adopt the commercial surfactants listed below. Applicable commercial surfactants include fluorine-containing surfactants such as Eftop EF301, EF303 (products of Shin-Akita Kasei K.K.), Florade FC430, 431 (products of Sumitomo 3M Co., Ltd.), Megafac F171, F173, F176, F189, R08 (products of Dainippon Ink and Chemicals, Inc.), Surflon S-382, SC101, 102, 103, 104, 105, 106 (products of Asahi Glass Co., Ltd.), and silicon-base surfactants. Also polysiloxane polymer KP-341 (product of Shin-Etsu Chemical Co., Ltd.) and Troysol S-366 (product of Troy Chemical Industries, Inc.) are adoptable as the silicon-base surfactants. In the present invention, it is also preferable to use the compounds described in paragraphs [0046] to [0052] in Japanese Laid-Open Patent Publication "Tokkai" No. 2004-331812, which are fluorine-containing surfactants not containing monomers expressed by the formula (a).

[Other Layers]

Between the support and the optically anisotropic layer of the transfer material of the present invention, it is preferable to form a thermoplastic polymer layer in order to control mechanical characteristics and conformity to irregularity.

Components used for the thermoplastic polymer layer are preferably organic polymer substances described in Japanese Laid-Open Patent Publication "Tokkaihei" No. 5-72724, and are particularly preferably selected from organic polymer substances having softening points, measured by the Vicat method (more specifically, a method of measuring softening point of polymer conforming to ASTMD1235 authorized by American Society For Testing and Materials) of approximately 80° C. or below. More specifically, organic polymers such as polyolefins including polyethylene and polypropylene; ethylene copolymers including those composed of ethylene and vinyl acetate or saponified product thereof, or composed of ethylene and acrylate ester or saponified product thereof; polyvinyl chloride; vinyl chloride copolymers including those composed of vinyl chloride and vinyl acetate or saponified product thereof; polyvinylidene chloride; vinylidene chloride copolymer; polystyrene; styrene copolymers including those composed of styrene and (meth)acrylate ester or saponified product thereof; polyvinyl toluene; vinyltoluene copolymers such as being composed of vinyl toluene and (meth)acrylate ester or saponified product thereof; poly(meth)acrylate ester; (meth)acrylate ester copolymers including those composed of butyl(meth)acrylate and vinyl acetate; vinyl acetate copolymers; and polyamide polymers including nylon, copolymerized nylon, N-alkoxymethylated nylon and N-dimethylamino-substituted nylon.

In the transfer material of the present invention, it is preferable to provide an intermediate layer for the purpose of preventing mixing of the components during coating of a plurality of layers and during storage after the coating. The oxygen shut-off film having an oxygen shut-off function described as a "separation layer" in Japanese Laid-Open Patent Publication "Tokkaihei" No. 5-72724 is preferably used, by which sensitivity during the light exposure increases, and this improves the productivity. Any films showing a low oxygen permeability and being dispersible and soluble to water or aqueous alkaline solution are preferably used as the oxygen shut-off film, and such films can properly be selected from any known films. Of these, particularly preferable is a combination of polyvinyl alcohol and polyvinyl pyrrolidone.

It is also allowable to use the thermoplastic polymer layer and the intermediate layer also as the alignment layer. In particular, a combination of polyvinyl alcohol and polyvinyl pyrrolidone preferably used as the intermediate layer is useful also as the alignment layer, and it is preferable to configure the intermediate layer and the alignment layer as a single layer.

On the polymer layer, it is preferable to provide a thin protective film for the purpose of preventing contamination or damage during storage. The protective film may be composed of a material same as, or similar to, that used for the temporary support, but must be readily separable from the polymer layer. Preferable examples of material composing the protective film include silicon paper, polyolefin sheet and polytetrafluoroethylene sheet.

The individual layers of the optically anisotropic layer, photosensitive polymer layer, and optionally-formed alignment layer, thermoplastic polymer layer and intermediate layer can be formed by coating such as dip coating, air knife coating, curtain coating, roller coating, wire bar coating, gravure coating and extrusion coating (U.S. Pat. No. 2,681,294). It is also allowable to simultaneously coat two or more layers. Methods of simultaneous coating is described in U.S. Pat. Nos. 2,761,791, 2,941,898, 3,508,947, 3,526,528, and in "Kotingu Kogaku (Coating Engineering), written by Yuji Harazaki, p. 253, published by Asakura Shoten (1973).

[Method of Forming Color Filter/Optically Anisotropic Layer Using Transfer Material]

Methods of forming the transfer material of the present invention on the substrate are not specifically limited, so far as the optically anisotropic layer and the photosensitive polymer layer can be transferred onto the substrate at the same time. For example, it is allowable to form the transfer material of the present invention in a film form, and bond it to the substrate so that the surface of the photosensitive polymer layer is faced to the surface of the substrate, by pressing with or without heating with rollers or flat plates of a laminator. Specific examples of the laminator and the method of lamination include those described in Japanese Laid-Open Patent Publication Nos. 7-110575, 11-77942, 2000-334836 and 2002-148794, wherein the method described in Japanese Laid-Open Patent Publication No. 7-110575 is preferable in view of low contamination. The support may be separated thereafter, and it is also allowable to form other layer, such as electrode layers, on the surface of the optically anisotropic layer exposed after the separation.

The substrate which is a target for transferring of the transfer material of the present invention can be a transparent substrate, which is exemplified for example by known glasses such as soda glass sheet having a silicon oxide film formed on the surface thereof, low-expansion glass and non-alkali glass; or plastic film. The target for transferring may be a transparent support having an optically anisotropic layer formed thereon in a solid manner. It is also allowable that the target for transferring can be improved in the adhesiveness with the photosensitive polymer layer by being preliminarily subjected to a coupling treatment. The coupling treatment is preferably carried out by using the method described in Japanese Laid-Open Patent Publication "Tokkai" No. 2000-39033. The thickness of the substrate is preferably 700 to 1200 µm in general, although being not specifically limited.

Light exposure is carried out over the entire surface for the case where a non-patterned optically anisotropic layer is formed on the target for transferring, or carried out in a pattern-making manner for the case where a patterned optically anisotropic layer, such as color filter, is formed. The light exposure in a pattern-making manner may be carried out by disposing a predetermined mask over the photosensitive polymer layer formed on the target for transferring, and by illuminating the photosensitive polymer layer from above the mask, or by focusing laser beam or electron beam to predetermined regions without using the mask. For the case of the color filter, there is formed a red (R) pattern configured by disposing at predetermined locations a stack of a predetermined colored polymer layer, such as a red (R) polymer layer, and the optically anisotropic layer. By repeating the same process steps using the transfer materials each having the green (G) polymer layer and blue (B) polymer layer, it is made possible to obtain the color filter with the optically anisotropic layer of the present invention, which is configured as having the colored polymer layer and the optically anisotropic layer equally patterned with the RGB pattern of the colored polymer layer. A light source for the light exposure herein can properly be selected from those capable of illuminating light having wavelength ranges capable of curing the polymer layer (365 nm, 405 nm, for example). Specific examples of the light source include extra-high voltage mercury lamp, high voltage mercury lamp and metal halide lamp. Energy of exposure generally falls in the range from 5 to 200 mJ/cm$^2$ or around, and preferably from 10 to 100 mJ/cm$^2$ or around.

A developing solution used in the development step after the light exposure is not specifically limited, allowing use of any known developing solution such as those described in Japanese Laid-Open Patent Publication "Tokkaihei" No. 5-72724. The developing solution is preferably such as allowing the polymer layer to show a dissolution-type developing behavior, and preferably such as containing a compound having pKa=7 to 13 to a concentration of 0.05 to 5 mol/L, for example. It is still also allowable to further add a small amount of an organic solvent miscible with water. Examples of the organic solvent miscible with water include methanol, ethanol, 2-propanol, 1-propanol, butanol, diacetone alcohol, ethylene glycol monomethyl ether, ethylene glycol monoethyl ether, ethylene glycol mono-butyl ether, benzyl alcohol, acetone, methyl ethyl ketone, cyclohexanone, ∈-caprolactone, γ-butyrolactone, dimethylformamide, dimethyl acetamide, hexamethyl phophorylamide, ethyl lactate, methyl lactate, ∈-caprolactam, and N-methylpyrrolidone. The concentration of the organic solvent is preferably adjusted to 0.1% by weight to 30% by weight.

The above-described developing solution can be added with any known surfactant. The concentration of the surfactant is preferably adjusted to 0.01% by weight to 10% by weight.

Methods of the development may be any of known methods such as paddle development, shower development, shower-and-spin development and dipping development. Non-cured portion of the polymer layer after the light exposure can be removed by showering a developing solution. It is preferable herein to preliminarily remove any thermoplastic polymer layer, intermediate layer and so forth before the development, typically by blasting a shower of an alkaline solution having only a small dissolving power against the polymer layer. It is also preferable, after the development, to blast a shower of cleaning agent, and to remove development residue typically by brushing. The developing solution may be any known ones, and preferable examples include "T-SD1" (trade name; product of Fuji Photo Film Co., Ltd.) containing phosphate, silicate, nonionic surfactant, defoaming agent and stabilizing agent; or "T-SD2" (trade name; product of Fuji Photo Film Co., Ltd.) containing sodium carbonate and phenoxyoxyethylene-base surfactant. The temperature of the developing solution is preferably 20° C. to 40° C., and pH of the developing solution is preferably 8 to 13.

In fabrication of the color filter, it is preferable in view of reducing the cost, as described in Japanese Laid-Open Patent Publication "Tokkaihei" No. 11-248921, to form a base by stacking the colored polymer composition for forming the color filter, to form the transparent electrode thereon, and to form, if necessary, spacers by stacking thereon projections for divisional orientation.

EXAMPLES

Paragraphs below will more specifically describe the present invention referring to Examples. Any materials, reagents, amount and ratio of use and operations shown in Examples may appropriately be modified without departing from the spirit of the present invention. It is therefore understood that the present invention is by no means limited to specific Examples below.

(Preparation of Coating Liquid CU-1 for Thermoplastic Polymer Layer)

The composition below was prepared, filtered through a polypropylene filter having a pore size of 30 μm, and the filtrate was used as coating liquid CU-1 for forming an alignment layer.

| Composition of Coating Liquid for forming Thermoplastic Polymer Layer | (% by weight) |
|---|---|
| methyl methacrylate/2-ethylhexyl acrylate/benzyl methacrylate/methacrylate copolymer (copolymerization ratio (molar ratio) = 55/30/10/5, weight-average molecular weight = 100,000, Tg ≈ 70° C.) | 5.89 |
| styrene/acrylic acid copolymer (copolymerization ratio (molar ratio) = 65/35, weight-average molecular weight = 10,000, Tg ≈ 100° C.) | 13.74 |
| BPE-500 (from Shin-Nakamura Chemical Co., Ltd.) | 9.20 |
| Megafac F-780-F (from Dainippon Ink and Chemicals, Inc.) | 0.55 |
| methanol | 11.22 |
| propylene glycol monomethyl ether acetate | 6.43 |
| methyl ethyl ketone | 52.97 |

(Preparation of Coating Liquid AL-1 for Intermediate Layer/Alignment Layer)

The composition below was prepared, filtered through a polypropylene filter having a pore size of 30 μm, and the filtrate was used as coating liquid AL-1 for forming an intermediate layer/alignment layer.

| Composition of Coating Liquid AL-1 for Intermediate Layer/Alignment layer | (% by weight) |
|---|---|
| polyvinyl alcohol (PVA205, from Kuraray Co., Ltd.) | 3.21 |
| polyvinylpyrrolidone (Luvitec K30, from BASF) | 1.48 |
| distilled water | 52.1 |
| methanol | 43.21 |

(Preparation of Coating Liquids LC-R1 and LC-R2 for Optically Anisotropic Layer)

The compositions below were prepared, filtered through a polypropylene filter having a pore size of 0.2 μm, and the filtrates were used as coating liquids LC-R1 and LC-R2 for forming an optically anisotropic layer.

LC-1-1 was synthesized according to the method described in Tetrahedron Lett., Vol. 43, p. 6793 (2002). LC-1-2 was synthesized according to the method described in EP1388538A1, p. 21.

|  | (% by weight) |
|---|---|
| Composition of Coating Liquid LC-R1 for Optically Anisotropic Layer | |
| rod-like liquid crystal (Paliocolor LC242, from BASF Japan) | 28.6 |
| chiral agent (Paliocolor LC756, from BASF Japan) | 3.40 |
| 4,4'-azoxydianisole | 0.52 |
| styrene boronate | 0.02 |
| horizontal orientation agent (LC-1-1) | 0.10 |
| photopolymerization initiator (LC-1-2) | 1.36 |
| methyl ethyl ketone | 66.0 |
| Composition of Coating Liquid LC-R2 for Optically Anisotropic Layer | |
| rod-like liquid crystal (Paliocolor LC242, BASF Japan) | 36.8 |
| horizontal orientation agent (LC-1-1) | 0.12 |
| photopolymerization initiator (LC-1-2) | 1.53 |
| methyl eethyl ketone | 61.55 |

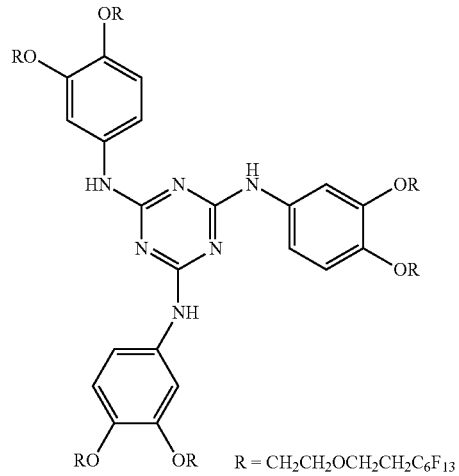

(LC-1-1)

R = CH$_2$CH$_2$OCH$_2$CH$_2$C$_6$F$_{13}$

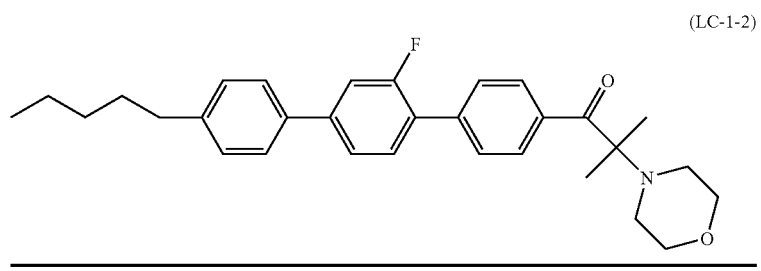

(LC-1-2)

(Preparation of Coating Liquids LC-G1 and LC-G2 for Optically Anisotropic Layer)

The compositions below were prepared, filtered through a polypropylene filter having a pore size of 0.2 μm, and the filtrates were used as coating liquids LC-G1 and LC-G2 for forming an optically anisotropic layer.

|  | (% by weight) |
|---|---|
| Composition of Coating Liquid LC-G1 for Optically Anisotropic Layer | |
| rod-like liquid crystal (Paliocolor LC242, from BASF Japan) | 28.36 |
| chiral agent (Paliocolor LC756, from BASF Japan) | 3.34 |
| 4,4'-azoxydianisol | 0.27 |
| styrene boronate | 0.02 |
| horizontal orientation agent (LC-1-1) | 0.10 |
| photopolymerization initiator (LC-1-2) | 1.34 |
| methyl ethyl ketone | 66.57 |
| Composition of Coating Liquid LC-G2 for Optically Anisotropic Layer | |
| rod-like liquid crystal (Paliocolor LC242, from BASF Japan) | 31.9 |
| horizontal orientation agent (LC-1-1) | 0.10 |
| photopolymerization initiator (LC-1-2) | 1.33 |
| methyl ethyl ketone | 66.67 |

(Preparation of Coating Liquids LC-B1 and LC-B2 for Optically Anisotropic Layer)

The compositions below were prepared, filtered through a polypropylene filter having a pore size of 0.2 μm, and the filtrates were used as coating liquids LC-B1 and LC-B2 for forming an optically anisotropic layer.

| Composition of Coating Liquid LC-B1 for Optically Anisotropic Layer | (% by weight) |
|---|---|
| rod-like liquid crystal (Paliocolor LC242, from BASF Japan) | 28.70 |
| chiral agent (Paliocolor LC756, from BASF Japan) | 3.36 |
| 4,4'-azoxydianisole | 0.03 |
| styrene boronate | 0.02 |
| horizontal orientation agent (LC-1-1) | 0.10 |
| photopolymerization initiator (LC-1-2) | 1.34 |
| methyl ethyl ketone | 66.45 |
| Composition of Coating Liquid LC-B2 for Optically Anisotropic Layer | |
| rod-like liquid crystal (Paliocolor LC242, from BASF Japan) | 27.0 |
| horizontal orientation agent (LC-1-1) | 0.08 |
| photopolymerization initiator (LC-1-2) | 1.13 |
| methyl ethyl ketone | 71.79 |

(Preparation of Coating Liquid LC-1 for Optically Anisotropic Layer)

The composition below was prepared, filtered through a polypropylene filter having a pore size of 0.2 μm, and the filtrate was used as coating liquids LC-1 for forming an optically anisotropic layer.

| Composition of Coating Liquid LC-1 for Optically Anisotropic Layer | (% by weight) |
|---|---|
| rod-like liquid crystal (Paliocolor LC242, from BASF Japan) | 28.38 |
| chiral agent (Paliocolor LC756, from BASF Japan) | 3.34 |
| 4,4'-azoxydianisol | 0.27 |
| horizontal orientation agent (LC-1-1) | 0.10 |
| photopolymerization initiator (LC-1-2) | 1.34 |
| methyl ethyl ketone | 66.57 |

(Preparation of Coating Liquid LC-2 for Optically Anisotropic Layer)

The composition below was prepared, filtered through a polypropylene filter having a pore size of 0.2 μm, and the filtrate was used as coating liquids LC-2 for forming the optically anisotropic layer. LC-2-1 was synthesized according to a method described in Japanese Laid-Open Patent Publication "Tokkaihei" No. 2001-166147. LC-2-2 was synthesized by dissolving a commercial hydroxyethyl methacrylate, acrylic acid, and M5610 (product of Daikin Industries, Ltd.) in a ratio by weight of 15/5/80 into methyl ethyl ketone (concentration 40%), and the mixture was allowed to polymerize using V-601 (product of Wako Pure Chemical Industries, Ltd.) as a polymerization initiator. LC-2-3 was synthesized by first introducing octyloxybenzoic acid (product of Kanto Chemical Co., Inc.) into an excessive hydroquinone (product of Wako Pure Chemical Industries, Ltd.) based on the mixed acid anhydride process so as to obtain monoacyl phenol compound. Next, methyl p-hydroxybenzoate was converted to a hydroxyl ethyl compound using ethylene carbonate, the resultant ester is hydrolyzed, and brominated with hydrobromic acid to obtain 2-bromoethyloxybenzoic acid. Two these compounds were then esterified by the mixed acid anhydride process to obtain a diester compound, and the product was then converted to a quaternary compound using dimethylaminopyridine, to thereby obtain LC-2-3 as an onium salt.

| Composition of Coating Liquid LC-2 for Optically Anisotropic Layer | (% by weight) |
|---|---|
| discotic liquid crystalline compound (LC-2-1) | 30.0 |
| ethylene oxide-modified trimethylol propane triacrylate (V#360, from Osaka Organic Chemical Industry, Ltd.) | 3.3 |
| Photopolymerization initiator (Irgacure 907, from Ciba Specialty Chemicals) | 1.0 |
| sensitizer (Kayacure DETX, from Nippon Kayaku Co., Ltd.) | 0.33 |
| vertical alignment agent at the air interface side (LC-2-2) | 0.12 |
| vertical alignment agent at the alignment layer side (LC-2-3) | 0.15 |
| methyl ethyl ketone | 5.1 |

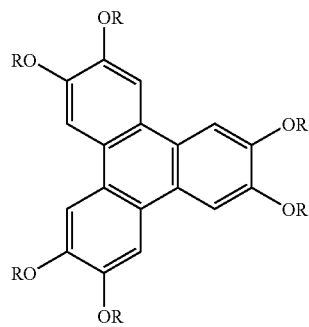

(LC-2-1)

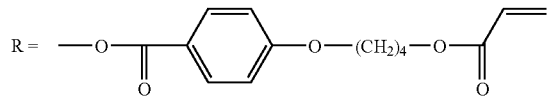

| Composition of Coating Liquid LC-2 for Optically Anisotropic Layer | (% by weight) |
|---|---|

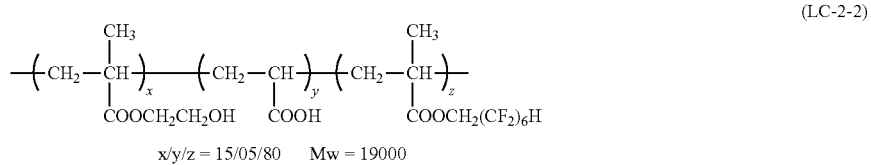
(LC-2-2)

x/y/z = 15/05/80    Mw = 19000

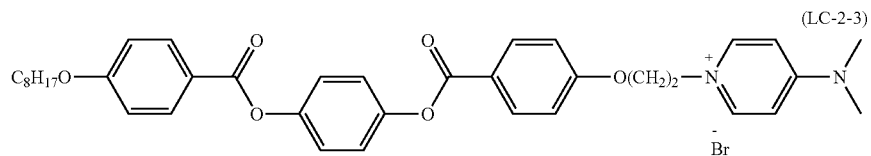
(LC-2-3)

(Preparation of Coating Liquid PP-1 for Photosensitive Polymer Layer)

The composition below was prepared, filtered through a polypropylene filter having a pore size of 0.2 μm, and the filtrate was used as coating liquids PP-1 for forming a photosensitive polymer layer.

| Composition of Coating Liquid PP-1 for Photosensitive polymer Layer | (% by weight) |
|---|---|
| random copolymer of benzyl methacrylate/methacrylic acid (72/28 by molar ratio, weight-average molecular weight = 37,000) | 5.0 |
| random copolymer of benzyl methacrylate/methacrylic acid (78/22 by molar ratio, weight-average molecular weight = 40,000) | 2.45 |
| KAYARAD DPHA (from Nippon Kayaku Co., Ltd.) | 3.2 |
| radical polymerization initiator (Irgacure 907, from Ciba Specialty Chemicals) | 0.75 |
| sensitizer (Kayacure DETX, from Nippon Kayaku Co., Ltd.) | 0.25 |
| propylene glycol monomethyl ether acetate | 27.0 |
| methyl ethyl ketone | 53.0 |
| cyclohexanone | 9.2 |
| Megafac F-176PF (from Dainippon Ink and Chemicals, Inc.) | 0.05 |

Next paragraphs will describe methods of preparing coating liquids for photosensitive polymer layers. Table 1 shows compositions of the individual coating liquids for forming the photosensitive polymer layers.

| (% by weight) | PP-K1 | PP-R1 | PP-G1 | PP-B1 |
|---|---|---|---|---|
| K pigment dispersion | 25 | — | — | — |
| R pigment dispersion-1 | — | 44 | — | — |
| R pigment dispersion-2 | — | 5.0 | — | — |
| G pigment dispersion | — | — | 24 | — |
| CF Yellow EC3393 (from Mikuni Color Works, Ltd.) | — | — | 13 | — |
| CF Blue EC3357 (from Mikuni Color Works, Ltd.) | — | — | — | 7.2 |
| CF Yellow EC3383 (from Mikuni Color Works, Ltd.) | — | — | — | 13 |
| propylene glycol monomethyl ether acetate (PGMEA) | 8.0 | 7.6 | 29 | 23 |
| methyl ethyl ketone | 53.494 | 37.412 | 25.115 | 35.78 |
| cyclohexanone | — | — | 1.3 | — |
| binder 1 | 9.1 | — | 3.0 | — |
| binder 2 | — | 0.8 | — | — |
| binder 3 | — | — | — | 17 |
| DPHA solution | 4.2 | 4.4 | 4.3 | 3.8 |
| 2-trichloromethyl-5-(p-styrylmethyl)-1,3,4-oxadiazole | — | 0.14 | 0.15 | 0.15 |
| 2,4-bis(trichloromethyl)-6-[4-(N,N-diethoxycarbonylmethyl)-3-bromophenyl]-s-triazine | 0.160 | 0.058 | 0.060 | — |
| phenothiazine | — | 0.010 | 0.005 | 0.020 |
| hydroquionone monomethyl ether | 0.002 | — | — | — |
| HIPLAAD ED152 (from Kusumoto Chemicals) | — | 0.52 | — | — |
| Megafac F-176PF (from Dainippon Ink and Chemicals, Inc.) | 0.044 | 0.060 | 0.070 | 0.050 |

Compositions listed in Table 1 are as follows.

| [Composition of K Pigment Dispersion] Composition of K Pigment Dispersion (%) | |
|---|---|
| carbon black (Special Black 250, from Degussa) | 13.1 |
| 5-[3-oxo-2-[4-[3,5-bis(3-diethyl aminopropyl aminocarbonyl)phenyl]aminocarbonyl]phenylazo]-butyroylaminobenzimidazolone | 0.65 |
| random copolymer of benzyl methacrylate/methacrylic acid (72/28 by molar ratio, weight-average molecular weight = 37,000) | 6.72 |
| propylene glycol monomethyl ether acetate | 79.53 |
| [Composition R Pigment Dispersion-1] Composition of R Pigment Dispersion-1 (%) | |
| C.I.Pigment Red 254 | 8.0 |
| 5-[3-oxo-2-[4-[3,5-bis(3-diethyl aminopropyl aminocarbonyl)phenyl]aminocarbonyl]phenylazo]-butyroylaminobenzimidazolone | 0.8 |
| random copolymer of benzyl methacrylate/methacrylic acid (72/28 by molar ratio, weight-average molecular weight = 37,000) | 8.0 |
| propylene glycol monomethyl ether acetate | 83.2 |
| [Composition of R Pigment Dispersion-2] Composition of R Pigment Dispersion-2 (%) | |
| C.I.Pigment Red 177 | 18.0 |
| random copolymer of benzyl methacrylate/methacrylic acid (72/28 by molar ratio, weight-average molecular weight = 37,000) | 12.0 |
| propylene glycol monomethyl ether acetate | 70.0 |

-continued

[Composition of G Pigment Dispersion]
Composition of G Pigment Dispersion (%)

| | |
|---|---|
| C.I.Pigment Green 36 | 18.0 |
| random copolymer of benzyl methacrylate/methacrylic acid (72/28 by molar ratio, weight-average molecular weight = 37,000) | 12.0 |
| cyclohexanone | 35.0 |
| propylene glycol monomethyl ether acetate | 35.0 |

[Composition of Binder 1]
Composition of Binder 1 (%)

| | |
|---|---|
| random copolymer of benzyl methacrylate/methacrylic acid (78/22 by molar ratio, weight-average molecular weight = 40,000) | 27.0 |
| propylene glycol monomethyl ether acetate | 73.0 |

[Composition of Binder 2]
Composition of Binder 2 (%)

| | |
|---|---|
| random copolymer of benzyl methacrylate/methacrylic acid/methyl methacrylate (38/25/37 by molar ratio, weight-average molecular weight = 30,000) | 27.0 |
| propylene glycol monomethyl ether acetate | 73.0 |

[Composition of Binder 3]
Composition of Binder 3 (%)

| | |
|---|---|
| random copolymer of benzyl methacrylate/methacrylic acid/methyl methacrylate(36/22/42 by molar ratio, weight-average molecular weight = 30,000) | 27.0 |
| propylene glycol monomethyl ether acetate | 73.0 |

[Composition of DPHA]
Composition of DPHA Solution (%)

| | |
|---|---|
| KAYARAD DPHA (from Nippon Kayaku Co., Ltd.) | 76.0 |
| propylene glycol monomethyl ether acetate | 24.0 |

(Preparation of Coating Liquid PP-K1 for Photosensitive Polymer Layer)

Coating liquid PP-K1 for the photosensitive polymer layer was obtained first by weighing K pigment dispersion and propyleneglycol monomethy ether acetate listed in Table 1 according to the amounts listed therein, mixing them at 24° C. (±2° C.), stirring the mixture at 150 rpm for 10 minutes, then weighing methyl ethyl ketone, binder 1, hydroquinone monomethyl ether, DPHA solution, 2,4-bis(trichloromethyl)-6-[4-(N,N-diethoxycabonylmethyl)-3-bromophenyl]-s-triazine, and Megafac F-176PF according to the amounts listed in Table 1, adding them in this order at 25° C. (±2° C.), and stirring the mixture at 40° C. (±2° C.) at 150 rpm for 30 minutes.

(Preparation of Coating Liquid PP-R1 for Photosensitive Polymer Layer)

Coating liquid PP-R1 for the photosensitive polymer layer was obtained first by weighing R pigment dispersion-1, R pigment dispersion-2 and propylene glycol monomethyl ether acetate listed in Table 1 according to the amounts listed therein, mixing them at 24° C. (±2° C.), stirring the mixture at 150 rpm for 10 minutes, weighing methyl ethyl ketone, binder 2, DPHA solution, 2-trichloromethyl-5-(p-styrylstyryl)-1,3,4-oxadiazole, 2,4-bis(trichloromethyl)-6-[4-(N,N-diethoxycarbonylmethyl)-3-bromophenyl]-s-triazine and phenothiazine according to the amounts listed in Table 1, adding them in this order at 24° C. (±2° C.), stirring the mixture at 150 rpm for 10 minutes, weighing ED152 according to the amount listed in Table 1, adding it at 24° C. (±2° C.), stirring the mixture at 150 rpm for 20 minutes, weighing Megafac F-176PF according to the amount listed in Table 1, adding it at 24° C. (±2° C.), stirring the mixture at 30 rpm for 30 minutes, and filtering the mixture through a #200 nylon mesh.

(Preparation of Coating Liquid PP-G1 for Photosensitive Polymer Layer)

Coating liquid PP-G1 for photosensitive polymer layer was obtained first by first weighing G pigment dispersion, CF Yellow EX3393 and propylene glycol monomethyl ether acetate according to the amounts listed in Table 1, mixing them at 24° C. (±2° C.), stirring the mixture at 150 rpm for 10 minutes, then weighing methyl ethyl ketone, cyclohexanone, binder 1, DPHA solution, 2-trichloromethyl-5-(p-styrylstyryl)-1,3,4-oxadiazole, 2,4-bis(trichloromethyl)-6-[4-(N,N-diethoxycarbonylmethyl)-3-bromophenyl]-s-triazine and phenothiazine according to the amounts listed in Table 1, adding them in this order at 24° C. (±2° C.), stirring the mixture at 150 rpm for 30 minutes, then weighing Megafac F-176PF according to the amount listed in Table 1, adding it at 24° C. (±2° C.), stirring the mixture at 30 rpm for 5 minutes, and filtering the mixture through a #200 nylon mesh.

(Preparation of Coating Liquid PP-B1 for Photosensitive Polymer Layer)

Coating liquid PP-B1 for photosensitive polymer layer was obtained first by weighing CF Blue EX3357, CF Blue EX3383 and propylene glycol monomethyl ether acetate according to the amounts listed in Table 1, mixing them at 24° C. (±2° C.), stirring the mixture at 150 rpm for 10 minutes, then weighing methyl ethyl ketone, binder 3, DPHA solution, 2-trichloromethyl-5-(p-styrylstyryl)-1,3,4-oxadiazole, and phenothiazine according to the amounts listed in Table 1, adding them in this order at 25° C. (±2° C.), stirring the mixture at 40° C. (±2° C.) at 150 rpm for 30 minutes, then weighing Megafac F-176 PF according to the amount listed in Table 1, adding it at 24° C. (±2° C.), stirring the mixture at 30 rpm for 5 minutes, and filtering the mixture through a #200 nylon mesh.

(Production of Photosensitive Polymer Transfer Material for Black Matrix)

To the surface of a temporary support formed of a 75-μm-thick polyethylene terephthalate film, coating liquid CU-1 was applied through a slit-formed nozzle, and dried. Next, coating liquid AL-1 was applied to thereto and dried. Photosensitive polymer composition PP-K1 was then applied thereto and dried, to thereby form on the temporary support a thermoplastic polymer layer having a thickness of 14.6 μm in a dried state, an intermediate layer having a dry film thickness of 1.6 μm, and a photosensitive polymer layer having a dry film thickness of 2.4 μm, and thereon a protective film (12-μm-thick polypropylene film) was bonded under pressure. Photosensitive polymer transfer material K-1 for forming the black matrix, comprising the temporary support, the thermoplastic polymer layer and the intermediate layer (oxygen shut-off film) and the black (K) photosensitive polymer layer disposed in this order, was thus produced.

(Polarized Light UV Irradiation Apparatus POLUV-1)

A polarized UV irradiation apparatus was produced using a ultraviolet irradiation apparatus (Light Hammer 10, 240 W/cm, product of Fusion UV Systems) based on microwave UV light source, equipped with a D-Bulb showing a strong emission spectrum in the range from 350 to 400 nm, and disposing a wire-grid polarization filter (ProFlux PPL02 (high-tranmissivity-type), product of Moxtek) 3 cm away from the irradiation plane thereof. Maximum illuminance of the device was found to be 400 mW/cm$^2$.

(Production of Transfer Material of Example 1)

As a temporary support, a 75-μm thick polyethylene terephthalate film was used. The coating liquid CU-1 was applied to a surface of the film through a slit-formed nozzle, and dried, to form a thermoplastic polymer layer. Next, the coating liquid AL-1 was applied to a surface of the layer and dried, to form an alignment layer. The thickness of the thermoplastic polymer layer was found to be 14.6 μm, and the alignment layer found to be 1.6 µm. Next, thus-formed alignment layer was rubbed, and to a rubbed surface of the alignment layer, the coating liquid LC-1 was applied using a #6 wire bar coater, the coated layer was dried at a film surface temperature of 95° C. for 2 minutes, to thereby form a layer of a uniform liquid crystal phase. Upon being matured, the layer was immediately irradiated by a polarized UV light (illuminance=200 mW/cm$^2$, illumination energy=200 mJ/cm$^2$) using POLUV-1 under a nitrogen atmosphere having an oxygen concentration of 0.3% or less, while aligning the transmission axis of the polarizer plate with the TD direction of the transparent support, so as to fix the optically anisotropic layer, to thereby form a 2.75-µm-thick optically anisotropic layer. Lastly, photosensitive polymer composition PP-1 was applied to a surface of the optically anisotropic layer and dried, to thereby produce the photosensitive polymer transfer material according to Example 1 of the present invention.

(Production of Photosensitive Polymer Transfer Material for R, G, B Colors)

As a temporary support, a 75-µm-thick polyethylene terephthalate film was used. To a surface of the film, the coating liquid CU-1 was applied through a slit-formed nozzle, and dried, to form a thermoplastic polymer layer. Next, the coating liquid AL-1 was applied to a surface of the layer and dried, to form an alignment layer. The thickness of the thermoplastic polymer layer was found to be 14.6 µm, and the alignment layer found to be 1.6 µm. Next, thus-formed alignment layer was rubbed, and further to a rubbed surface of the alignment layer, the coating liquid LC-R1 was applied using a #6 wire bar coater. The coated layer was dried at a film surface temperature of 95° C. for 2 minutes, to thereby form a layer of a uniform liquid crystal phase. Upon being matured, the layer was immediately irradiated by a polarized UV light (illuminance=200 mW/cm$^2$, illumination energy=200 mJ/cm$^2$) using POLUV-1 under a nitrogen atmosphere having an oxygen concentration of 0.3% or less, while aligning the transmission axis of the polarizer plate with the TD direction of the transparent support, so as to fix the optically anisotropic layer, to thereby form a 2.8-µm-thick optically anisotropic layer. Lastly, photosensitive polymer composition PP-R1 was applied to a surface of the optically anisotropic layer, and dried, to thereby form a 2.0-µm-thick photosensitive polymer layer, and thereby produce the photosensitive polymer transfer material R-1 for R color according to Example 2 of the present invention.

Also photosensitive polymer layer G-1 for G color of Example 3, and B-1 for B color of Example 4, were formed similarly to the above, except that PP-G1 and PP-B1 were respectively used in place of PP-R1, and that LC-G1 and LC-B1 were applied to surfaces using #6 and #5 bars, respectively, for forming the optically anisotropic layers. The thicknesses of the optically anisotropic layers of G-1 and B-1 were found to be 2.75 µm and 2.3 µm, respectively.

(Production of Transfer Material of Example 5)

The transfer material for use in production of an IPS-mode device according to Example 5 was produced similarly to as Example 1, except that coating liquid LC-2 was applied to a surface using a #3.4 wire bar coater, dried and matured under heating at 125° C. for 3 minutes, to thereby obtain a layer of a uniform liquid crystal phase, and that the coated layer was then illuminated in the air atmosphere by ultraviolet radiation with an illuminance of 400 mW/cm$^2$ and an irradiation energy of 300 mJ/cm$^2$, using a 160-W/cm, air-cooled metal halide lamp (product of Eyegraphics Co., Ltd.), so as to fix the optically anisotropic layer, to thereby obtain a 1.6-µm-thick optically anisotropic layer.

(Production of Photosensitive Polymer Transfer Material for R, G, B Colors for Reflective Domains of Examples 8 to 10)

So-called, A-plate was produced as an optically anisotropic layer used for the reflective domains. More specifically, to a surface of a temporary support formed of a 75-µm-thick rolled polyethylene terephthalate film, the coating liquid CU-1 was applied through a slit-formed nozzle, and dried, to form a thermoplastic polymer layer. Next, the coating liquid AL-1 was applied to a surface of the layer and dried, to form an alignment layer. The thickness of the thermoplastic polymer layer was found to be 14.6 µm, and the alignment layer found to be 1.6 µm. Next, thus-formed alignment layer was rubbed, and further to a rubbed surface of the alignment layer, the coating liquid LC-R2 was applied using a #2 wire bar coater, the coated layer was dried at a film surface temperature of 95° C. for 2 minutes, to thereby form a layer of a uniform liquid crystal phase. Upon being matured, the layer was immediately irradiated by a polarized UV light (illuminance=1,000 mW/cm$^2$, illumination energy=700 mJ/cm$^2$) using POLUV-1 under a nitrogen atmosphere having an oxygen concentration of 0.3% or less, while aligning the transmission axis of the polarizer plate with the TD direction of the transparent support, so as to fix the optically anisotropic layer, to thereby form a 1.7-µm-thick optically anisotropic layer. Lastly, photosensitive polymer composition PP-R1 was applied to a surface of the optically anisotropic layer and dried, to thereby form a 1.1-µm-thick photosensitive polymer layer, and to thereby produce the photosensitive polymer transfer material R-2 for R color for reflective domains according to Example 8 of the present invention.

Also photosensitive polymer layer G-2 for G color of Example 9 for reflective domains, and B-2 for B color for reflective domains of Example 10, were formed similarly to the above, except that PP-G1 and PP-B1 were respectively used in place of PP-R1, and that LC-G2 and LC-B2 were used in place of LC-R2. The thicknesses of the optically anisotropic layers of G-1 and B-1 were found to be 1.4 µm and 1.1 µm, and the thicknesses of the photosensitive polymer layers were found to be 1.2 µm and 1.3 µm, respectively.

(Measurement of Retardation)

Frontal retardation Re(0) of each sample at an arbitrary wavelength λ, was measured using a fiber-type spectrometer based on the parallel Nicol method. And Re(40) and Re(−40) of each sample at an arbitrary wavelength λ, were measured while inclining the sample by ±40° using the slow axis as the axis of rotation in the same manner as the Frontal retardation Re(0). As for colors R, G and B, retardations were measured at wavelengths λ of 611 nm, 545 nm and 435 nm, respectively. Each sample was prepared by transferring all layers of the transfer material from on the temporary support to on a glass substrate. Retardation was determined only for the optically anisotropic layer causative of retardation, by correction using preliminarily-measured transmissivity data of the color filter. Results of the retardation measurement for Examples 1 to 5, and 8 to 10 are shown in Table 2.

| Sample | Re (0) | Re (40) | Re (−40) |
|---|---|---|---|
| Example 1 | 33.0 | 67.1 | 67.3 |
| Example 2 | 19.1 | 50.3 | 50.4 |
| Example 3 | 33.6 | 67.3 | 67.8 |
| Example 4 | 48.2 | 86.4 | 86.1 |
| Example 5 | 130.0 | 119.8 | 119.2 |
| Example 8 | 152.5 | 149.0 | 149.2 |
| Example 9 | 137.5 | 130.8 | 130.2 |
| Example 10 | 112.5 | 104.5 | 104.1 |

(Production of Color Filter 1)

Color filter 1 was produced according to the method described below.

A non-alkali glass substrate was cleaned using a rotating nylon-haired brush while being blasted with a shower of a glass cleaner solution conditioned at 25° C. for 20 seconds, then showered with purified water, blasted with a shower of a silane coupling solution (0.3% aqueous solution of N-β-(aminoethyl)-γ-aminopropyl trimethoxysilane, trade name: KBM-603, Shin-Etsu Chemical Co., Ltd.) for 20 seconds, and then washed with a shower of purified water. The obtained substrate was then heated in a substrate preheating heater at 100° C. for 2 minutes.

The above-described transfer material of Example 1 was then laminated onto the substrate preheated at 100° C. for 2 minutes, using a laminator (product of Hitachi Industries Co., Ltd. (model Lamic II)) under a rubber roller temperature of 130° C., a line pressure of 100 N/cm and a travel speed of 2.2 m/min, the protective film was separated therefrom, and the entire surface thereof was then subjected to light exposure using an extra-high-voltage mercury lamp at an exposure energy of 50 mJ/cm$^2$, and then baked at 240° C. for 2 hours, to thereby obtain a glass substrate of the present invention for VA-LCD.

Next, the black matrix and the R, G and B color filters were formed on the above-described glass substrate using a transfer system (product of Fuji Photo Film Co., Ltd.) described in Fujifilm Research & Development No. 44 (1999), p. 25. Therefore, Color Filter 1 was obtained.

(Production of Color Filter 2)

Color filter 2 was produced according to the method described below.

—Formation of Black (K) Pattern—

A non-alkali glass substrate was cleaned using a rotating nylon-haired brush while being blasted with a shower of a glass cleaner solution conditioned at 25° C. for 20 seconds, then showered with purified water, blasted with a shower of a silane coupling solution (0.3% aqueous solution of N-β-(aminoethyl)-γ-aminopropyl trimethoxysilane, trade name: KBM-603, Shin-Etsu Chemical Co., Ltd.) for 20 seconds, and then washed with a shower of purified water. The obtained substrate was then heated in a substrate preheating heater at 100° C. for 2 minutes.

The above-described photosensitive polymer transfer material K-1, after being separated from its protective film, was laminated onto the substrate preheated at 100° C. for 2 minutes, using a laminator (product of Hitachi Industries Co., Ltd. (model Lamic II)) under a rubber roller temperature of 130° C., a line pressure of 100 N/cm and a travel speed of 2.2 m/min.

The photosensitive polymer layer, after the protective film was separated therefrom, was subjected to light exposure in a pattern-making manner using a proximity-type exposure apparatus having an extra-high-voltage mercury lamp (product of Hitachi Electronics Engineering Co., Ltd.), wherein the substrate and a mask (quartz-made photomask having an image pattern formed thereon) were vertically held while keeping a distance between the surface of the photomask and the photosensitive polymer layer of 200 μm away from each other, under an exposure energy of 70 mJ/cm$^2$.

Next, shower development was carried out using a triethanolamine-base developing solution (containing 2.5% of triethanolamine, a nonionic surfactant, and a polypropylene-base defoaming agent, trade name: T-PD1, product of Fuji Photo Film Co., Ltd.) at 30° C. for 50 seconds, under a flat nozzle pressure of 0.04 MPa, to thereby remove the thermoplastic polymer layer and the oxygen shut-off film.

Thereafter, the photosensitive polymer layer was developed using a shower of a sodium carbonate-base developing solution (containing 0.06 mol/L of sodium hydrogencarbonate, sodium carbonate of the same concentration, 1% of sodium dibutylnaphthalene sulfonate, anionic surfactant, defoaming agent and stabilizer, trade name: T-CD1, product of Fuji Photo Film Co., Ltd.) under a conical nozzle pressure of 0.15 MPa, to thereby obtain the patterned pixels.

Thereafter, residues were removed using a rotating nylon-haired brush while being blasted with a shower of a cleaning agent (containing phosphate, silicate, nonionic surfactant, defoaming agent and stabilizer, trade name: T-SD1 (product of Fuji Photo Film Co., Ltd.) under a conical nozzle pressure of 0.02 MPa, to thereby obtain the black (K) pattern. Thereafter, the substrate was further subjected to post-exposure from the polymer layer side thereof using an extra-high-voltage mercury lamp under an exposure energy of 500 mJ/cm$^2$, and was then annealed at 220° C. for 15 minutes.

The substrate having the black (K) pattern formed thereon was again washed with the brush in the same manner as the above, showered with purified water, without being blasted with a shower of a silane coupling solution, and then heated in a substrate preheating heater at 100° C. for 2 minutes.

—Formation of Red (R) Pixels—

Red (R) pixels and 28×28-μm square red (R) patterns were formed using the above-described photosensitive polymer transfer material R-1, on the substrate having the black (K) pattern already formed thereon, by the process steps similar to those for the above-described photosensitive polymer transfer material K-1. The exposure energy herein was adjusted to 40 mJ/cm$^2$. The substrate having the R pixels formed thereon was again cleaned with the brush as described in the above, washed with a shower of purified water, and heated in a preheating device at 100° C. for 2 minutes, without using a silane coupling solution.

—Formation of Green (G) Pixels—

Green (G) pixels were formed using the above-described photosensitive polymer transfer material G-1 on the substrate having the red (R) pixels already formed thereon, and green (G) patterns were formed so as to cover the entire portion of the red (R) patterns, by the process steps similar to those for the above-described photosensitive polymer transfer material K-1. The exposure energy herein was adjusted to 40 mJ/cm$^2$. The substrate having the R and G pixels formed thereon was again cleaned with the brush as described in the above, washed with a shower of purified water, and heated in a preheating device at 100° C. for 2 minutes, without using a silane coupling solution.

—Formation of Blue (B) Pixels—

Blue (B) pixels were formed using the above-described photosensitive polymer transfer material B-1 on the substrate having the red (R) pixels and the green (G) pixels already formed thereon, by the process steps similar to those for the above-described photosensitive polymer transfer material K-1. The exposure energy herein was adjusted to 30 mJ/cm$^2$. The substrate having the R, G and B pixels formed thereon was again cleaned with the brush as described in the above, washed with a shower of purified water, and heated in a preheating device at 100° C. for 2 minutes, without using a silane coupling solution.

The substrate having the R, G, B pixels and K patterns formed thereon was baked at 240° C. for 50 minutes, to thereby produce Color Filter 2.

(Formation of Transparent Electrode)

On each of Color Filter Nos. 1 and 2 produced in the above, a transparent electrode film was formed by sputtering of an ITO target.

(Production of Photosensitive Transfer Material for Projections)

To a surface of a temporary support formed of a 75-μm thick polyethylene terephthalate film, the coating liquid CU-1 was applied and dried, to thereby provide a thermoplastic polymer layer having a dry film thickness of 15 μm.

Next, coating liquid AL-1 for forming the intermediate layer/alignment layer was coated on the thermoplastic polymer layer, and dried, to thereby provide an intermediate layer having a dry film thickness of 1.6 μm.

To a surface of the intermediate layer, a coating liquid having a composition below was then applied and dried, to thereby provide a photosensitive polymer layer for forming projections for controlling liquid crystal orientation, having a dry film thickness of 2.0 μm.

| Composition of Coating Liquid for Projections (%) | |
|---|---|
| FH-2413F (from FUJIFILM Electronic Materials Co., Ltd.) | 53.3 |
| methyl ethyl ketone | 46.66 |
| Megafac F-176PF | 0.04 |

A 12-μm-thick polypropylene film was further bonded as a cover film onto the surface of the photosensitive polymer layer, to thereby produce a transfer material having, on the temporary support, the thermoplastic polymer layer, the intermediate layer, the photosensitive polymer layer and the cover film stacked in this order.

(Formation of Projections)

The cover film was separated from the transfer material for forming projections produced in the above, the exposed surface of the photosensitive polymer layer is then opposed to the ITO-film-side surface of each of the product having the transparent electrode layer formed respectively on Color Filter Nos. 1 and 2, and the stack was laminated using a laminator (product of Hitachi Industries Co., Ltd. (model Lamic II)) under a line pressure of 100 N/cm, at 130° C., and a travel speed of 2.2 m/min. Thereafter, only the temporary support of the transfer material was separated at the interface with the thermoplastic polymer layer, and removed. The product up to this stage has, on the color-filter-side substrate, the photosensitive polymer layer, the intermediate layer and the thermoplastic polymer layer stacked in this order.

Next, a proximity exposure apparatus was disposed above the outermost thermoplastic polymer layer, so as to locate the photomask 100 μm away from the surface of the photosensitive polymer layer, and proximity light exposure was carried out through the photomask using an extra-high-voltage mercury lamp under an exposure energy of 70 mJ/cm$^2$. The substrate was then sprayed with a 1% aqueous triethanolamine solution at 30° C. for 30 seconds, using a shower developing apparatus, to thereby remove the thermoplastic polymer layer and the intermediate layer through dissolution. It was found that the photosensitive polymer layer at this stage was not substantially developed.

Next, the substrate was sprayed with an aqueous solution containing 0.085 mol/L of sodium carbonate, 0.085 mol/L of sodium hydrogencarbonate and 1% sodium dibutylnaphthalenesulfonate for development at 33° C. for 30 seconds, using a shower-type developing apparatus, to thereby remove unnecessary portion (uncured portion) of the photosensitive polymer layer. This resulted in formation of projections composed of the photosensitive polymer layer patterned according to a predetermined geometry, on the substrate on the color filter side thereof. Next, the substrate on the color filter side having the projections formed thereon was baked at 240° C. for 50 minutes, to thereby successfully form, on the substrate on the color filter side, the projections for controlling liquid crystal orientation, having a height of 1.5 μm and a semicircular section.

(Formation of Alignment Layer)

Further thereon, a polyimide orientation film was provided. An epoxy polymer sealing material containing spacer grains was printed at positions corresponded to the outer contour of the black matrix provided around the pixel group, and the color filter substrate and the opposing substrate (glass substrate having a TFT layer provided thereon) were bonded under a pressure of 10 kg/cm. Thus bonded glass substrates were then annealed at 150° C. for 90 minutes so as to allow the sealing material to cure, and thereby a stack of two glass substrates was obtained. The stack of the glass substrates was degassed in vacuo, and a liquid crystal was introduced therebetween by recovering the atmospheric pressure, to thereby obtain a liquid crystal cell. On both surfaces of the liquid crystal cell, polarizer plates HLC2-2518 from Sanritz Corporation were respectively bonded.

(Production of VA-LCD of Examples)

A three-band-phosphor-type white fluorescent lamp having an arbitrary color tone was produced as a cold-cathode-tube back light for color liquid crystal display device, using a phosphor composed of a 50:50 mixture on the weight basis of $BaMg_2Al_{16}O_{27}$:Eu,Mn and $LaPO_4$:Ce,Tb for green (G), $Y_2O_3$:Eu for red (R), and $BaMgAl_{10}O_{17}$:Eu for blue (B). The above-described liquid crystal cell having the polarizer plates bonded thereto was disposed on this back light, to thereby produce VA-LCDs of Example 6 (having color filter 1) and of Example 7 (having color filter 2).

(Production of VA-LCD of Comparative Examples)

A VA-LCD of Comparative Example 1 was produced similarly to as Example 6, except that the transfer material was omitted from the optically anisotropic layer, and instead a 2.75-μm-thick, G-1 optically anisotropic layer was formed on the protective film on the liquid crystal cell side of the lower polarizer plate, using AL-1 and LC-G1 similarly to that the G-1 optically anisotropic layer was formed.

(Evaluation of VA-LCDs)

Thus-produced liquid crystal display devices of Example 6 and Comparative Example 1 were first visually observed for their light leakage in particular at the corners of the LCD in a black state (under no applied voltage) under room temperature, and observed again after the devices were allowed to stand in a thermo-hygrostatic condition of 40° C., 90% RH for 48 hours. Results are shown in Table 3.

TABLE 3

| Sample | Results of Visual Observation |
|---|---|
| Example 6 | No distinct light leakage observed at the corners, leaving the black state almost unchanged. |
| Comparative Example 1 | A slight light leakage observed at the corners, although an overall level kept almost unchanged. |

(Evaluation of VA-LCD)

Figure 4:
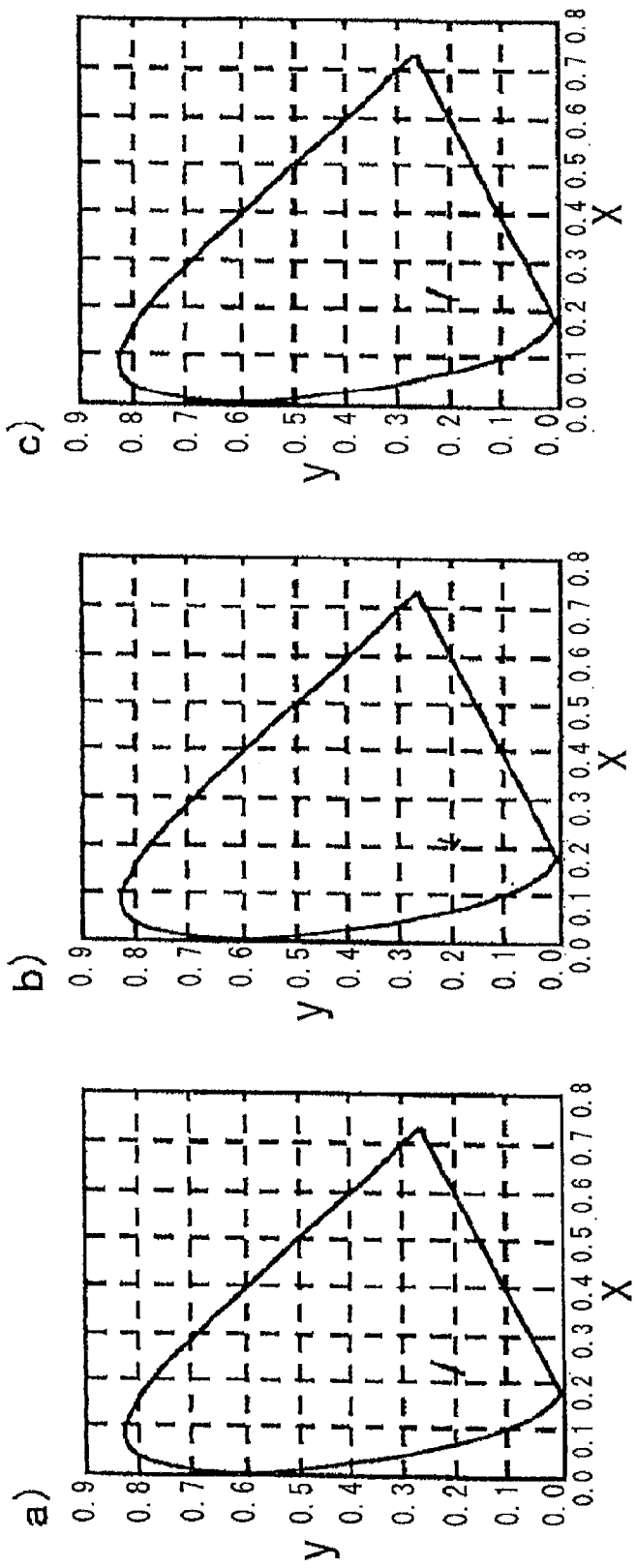
FIGS. 4(a) to 4(c) are drawings showing viewing angle dependence of color of a VA-LCD produced in Example 7.

Viewing angle characteristics of thus-produced liquid crystal display devices were measured using a viewing angle measuring instrument (EZ Contrast 160D, from ELDIM). Color changes observed for Example 7 in a black state (under no applied voltage) while varying viewing angle by 0 to 80° in the rightward direction from the front, in 45° upper-rightward direction, and in the upward direction, expressed on the xy chromaticity diagram were shown in FIGS. 4(a) to 4(c). And, Color changes observed for Comparative Example 1 in a black state (under no applied voltage) while varying viewing angle by 0 to 80° in the rightward direction from the front, in 45° upper-rightward direction, and in the upward direction, expressed on the xy chromaticity diagram were shown in FIGS. 5(a) to 5(c). And results of visual observation in particular in 45° upper-rightward direction were shown in Table 4.

TABLE 4

| Sample | Results of Visual Observation |
| --- | --- |
| Example 7 | Good viewing angle dependence of color, showing almost non-sensible color shift in the black state. |
| Comparative Example 1 | Coloring viewed in the oblique directions, while viewing angle dependence of contrast being kept at a level equivalent to Example 7. |

(Formation of Pixels with Transfer Material for IPS-Mode Displays)

G pixels were formed on the surface-processed glass substrate using the transfer material for IPS-mode displays in Example 5, similarly to that the transfer material G-1 was transferred. Thus-formed pixels observed under a polarizing microscope were found to show retardation.

(Production of Semi-Transmissive LCD: Example 11)

First, Color Filter No. 3 for semi-transmissive LCD was produced according to the method described below.

—Formation of Black (K) Pattern—

A non-alkali glass substrate was cleaned using a rotating nylon-haired brush while being blasted with a shower of a glass cleaner solution conditioned at 25° C. for 20 seconds, then washed with a shower of purified water, blasted with a shower of a silane coupling solution (0.3% aqueous solution of N-β-(aminoethyl)-γ-aminopropyl trimethoxysilane, trade name: KBM-603, Shin-Etsu Chemical Co., Ltd.) for 20 seconds, and then washed with a shower of purified water. The obtained substrate was then heated in a substrate preheating heater at 100° C. for 2 minutes.

The above-described photosensitive polymer transfer material K-1, after being separated from its protective film, was laminated onto the substrate preheated at 100° C. for 2 minutes, using a laminator (product of Hitachi Industries Co., Ltd. (model Lamic II)) under a rubber roller temperature of 130° C., a line pressure of 100 N/cm and a travel speed of 2.2 m/min.

The photosensitive polymer layer, after the protective film was separated therefrom, was subjected to light exposure in a pattern-making manner using a proximity-type exposure apparatus having an extra-high-voltage mercury lamp (product of Hitachi Electronics Engineering Co., Ltd.), wherein the substrate and a mask (quartz-made photomask having an image pattern formed thereon) were vertically held while keeping a distance between the surface of the photomask and the photosensitive polymer layer of 200 μm away from each other, under an exposure energy of 70 mJ/cm$^2$.

Next, shower development was carried out using a triethanolamine-base developing solution (containing 2.5% of triethanolamine, a nonionic surfactant, and a polypropylene-base defoaming agent, trade name: T-PD1, product of Fuji Photo Film Co., Ltd.) at 30° C. for 50 seconds, under a flat nozzle pressure of 0.04 MPa, to thereby remove the thermoplastic polymer layer and the oxygen shut-off film.

Thereafter, the photosensitive polymer layer was developed using a shower of a sodium carbonate-base developing solution (containing 0.06 mol/L of sodium hydrogencarbonate, sodium carbonate of the same concentration, 1% of sodium dibutylnaphthalene sulfonate, anionic surfactant, defoaming agent and stabilizer, trade name: T-CD1, product of Fuji Photo Film Co., Ltd.) under a conical nozzle pressure of 0.15 MPa, to thereby obtain the patterned pixels.

Thereafter, residues were removed using a rotating nylon-haired brush while being blasted with a shower of a cleaning agent (containing phosphate, silicate, nonionic surfactant, defoaming agent and stabilizer, trade name: T-SD1 (product of Fuji Photo Film Co., Ltd.) under a conical nozzle pressure of 0.02 MPa, to thereby obtain the black (K) pattern. Thereafter, the substrate was further subjected to post-exposure from the polymer layer side thereof using an extra-high-voltage mercury lamp under an exposure energy of 500 mJ/cm$^2$, and was then annealed at 220° C. for 15 minutes.

The substrate having the K pattern thus formed thereon was cleaned again using a brush as described in the above, further washed with a shower of purified water, and heated in a substrate preheating apparatus at 100° C. for 2 minutes, without using a silane coupling solution.

—Formation of Red (R), Green (G) and Blue (B) Pixels in Transmissive Domains—

Using a transfer system (product of Fuji Photo Film Co., Ltd.) described in Fujifilm Research & Development No. 44 (1999), p. 25, the R, G and B color filter layers were formed on the substrate having the above-described black matrix already formed thereon, in areas thereof corresponded to the transmissive domains of the RGB pixel areas. The thicknesses of the R, G and B layers were adjusted to 2 μm, 1.8 μm and 1.6 μm, respectively.

—Formation of Red (R), Green (G) and Blue (B) Pixels in Reflective Domains—

Next, the red (R) pattern was formed on the substrate in areas thereof corresponded to the reflective domains of the red (R) pixel areas, using the photosensitive polymer transfer material R-2, according to the process steps similar to those for the above-described photosensitive polymer transfer material K-1. The exposure energy herein was adjusted to 40 mJ/cm$^2$. The substrate having the R pixels thus formed thereon was again cleaned with a brush as described in the above, washed with a shower of purified water, and heated in a substrate preheating apparatus at 100° C. for 2 minutes, without using a silane coupling solution. Also green (G) and blue (B) pixels in reflective domains were formed by similar procedures using the above-described photosensitive polymer transfer materials G-2 and B-2. The exposure energy for B-2 herein was adjusted to 30 mJ/cm$^2$. Lastly, the substrate having R, G and B pixels and K pixels formed thereon was baked at 240° C. for 50 minutes, to thereby produce Color Filter No. 3.

(Formation of Transparent Electrode)

On Color Filter No. 3 produced in the above, a transparent electrode film was formed by sputtering of an ITO target.

(Formation of Alignment Layer)

Further thereon, a polyimide alignment layer was provided. Polyimide AL1254 manufactured by JSR Corporation was used as an orientation material, and was coated by the roll coating methods selectively in an area having the pixel electrodes formed therein. After the coating, the product was pre-baked at 80° C. for 15 minutes, and further baked at 200° C. for 60 minutes. As a consequence, an alignment layer of approximately 0.5 μm thick was obtained. The surface of the alignment layer was then subjected to orientation treatment using a rubbing apparatus. Conditions adopted herein were use of cotton cloth as a rubbing cloth, a rotating speed of 500 rpm, and an indentation depth of 0.3 mm.

(Preparation of Substrate on the Opposite Side)

As the opposing substrate, prepared was a substrate having a pixel pattern which includes a reflective domain, in which a 2.5-μm-thick photosensitive polymer layer was patterned according to a geometry of the reflective portion and a pattered Al film was formed thereon, and a transmissive domain formed thereon, in which an ITO transparent conductive film was formed by sputtering, and further having a pillar pattern controlling the gap, and a predetermined geometry of projection pattern for controlling the orientation.

(Production of Photosensitive Transfer Material for Projections)

The coating liquid CU-1 was applied to a surface of a temporary support, a 75-μm-thick polyethylene terephthalate film, and dried, to thereby provide a thermoplastic polymer layer having a dry film thickness of 15 μm.

Next, the coating liquid AL-1 was applied to a surface of the thermoplastic polymer layer and dried, to thereby provide an intermediate layer having a film thickness of 1.6 μm in a dried state.

A coating liquid having a formulation below was then applied to a surface of the intermediate layer and dried, to thereby provide a photosensitive polymer layer controlling liquid crystal orientation, having a dry film thickness of 2.0 μm.

| Composition of Coating Liquid for Projections (%) | |
| --- | --- |
| FH-2413F (from FUJIFILM Electronic Materials Co., Ltd.) | 53.3 |
| methyl ethyl ketone | 46.66 |
| Megafac F-176PF | 0.04 |

A 12-μm-thick polypropylene film was further bonded as a cover film onto the surface of the photosensitive polymer layer, to thereby produce the transfer material having, on the temporary support, the thermoplastic polymer layer, the intermediate layer, the photosensitive polymer layer and the cover film stacked in this order.

(Formation of Projections)

The cover film was separated from the transfer material for forming projections produced in the above, the exposed surface of the photosensitive polymer layer is then opposed to the opposing substrate on the transparent electrode film side thereof, and the stack was laminated using a laminator (product of Hitachi Industries Co., Ltd. (model Lamic II)) under a line pressure of 100 N/cm, at 130° C., and a travel speed of 2.2 m/min. Thereafter, only the temporary support of the transfer material was separated at the interface with the thermoplastic polymer layer, and removed. The product up to this stage has, on the color-filter-side substrate, the photosensitive polymer layer, the intermediate layer and the thermoplastic polymer layer stacked in this order.

Next, a proximity exposure apparatus was disposed above the outermost thermoplastic polymer layer, so as to locate the photomask 100 μm away from the surface of the photosensitive polymer layer, and proximity light exposure was carried out through the photomask using an extra-high-voltage mercury lamp under an exposure energy of 70 mJ/cm². The substrate was then sprayed with a 1% aqueous triethanolamine solution at 30° C. for 30 seconds, using a shower developing apparatus, to thereby remove the thermoplastic polymer layer and the intermediate layer through dissolution. It was found that the photosensitive polymer layer at this stage was not substantially developed.

Next, the substrate was sprayed with an aqueous solution containing 0.085 mol/L of sodium carbonate, 0.085 mol/L of sodium hydrogencarbonate and 1% sodium dibutylnaphthalenesulfonate for development at 33° C. for 30 seconds, using a shower-type developing apparatus, to thereby remove unnecessary portion (uncured portion) of the photosensitive polymer layer. This resulted in formation of projections composed of the photosensitive polymer layer patterned according to a predetermined geometry, on the substrate on the color filter side thereof. Next, the substrate on the color filter side having the projections formed thereon was baked at 240° C. for 50 minutes, to thereby successfully form, on the substrate on the color filter side, the projections for controlling liquid crystal orientation, having a height of 0.9 μm and a semicircular section.

(Formation of Alignment Layer on Opposite Side)

An polyimide alignment layer was formed on the transparent conductive layer of the opposing substrate, similarly to as on the color filter substrate. Polyimide AL1254 manufactured by JSR Corporation was used as the orientation material, and was coated by the roll coating method selectively in the region having the pixel electrodes formed therein. After the coating, the product was pre-baked at 80° C. for 15 minutes, and further baked at 200° C. for 60 minutes. As a consequence, an alignment layer of approximately 0.5 μm thick was obtained. The surface of the alignment layer was then subjected to orientation treatment using a rubbing apparatus. Conditions adopted herein were use of cotton cloth as a rubbing cloth, a rotating speed of 500 rpm, and an indentation depth of 0.3 mm. Direction of rubbing was set anti-parallel with the direction of orientation of the color filter substrate.

(Formation of Sealing Pattern)

A sealing pattern was formed on the periphery of the opposing substrate. An epoxy polymer containing 1% by weight of spacer grains (Stractbond XN-21S, from Nissan Chemical Industries, Ltd.) was printed using a seal dispenser apparatus, on a predetermined region surrounding the display region while leaving a portion corresponded to an injection port for the liquid crystal unclosed. The product was pre-baked at 80° C. for 30 minutes.

(Stacking)

The color filter substrate and the opposing substrate were aligned so as to be stacked at a correct position. While keeping this state, the bonded glass substrates were annealed under a pressure of 0.03 Mpa at 180° C. for 90 minutes so as to cure the sealing material, to thereby obtain a stack of two glass substrates. A balloon-type apparatus was used for the baking.

(Injection of Liquid Crystal)

A liquid crystal material was injected into the stack of the glass substrates using a liquid crystal injection apparatus. The liquid crystal material, manufactured by Chisso Corporation, was placed in a liquid crystal dish, and was held together with the substrate stack in a vacuum chamber kept at a degree of vacuum of $10^{-1}$ Pa for 60 minutes for degassing. After evacuated to a sufficient degree, the atmospheric pressure was recovered while keeping the injection port provided in the seal as being dipped in the liquid crystal for 180 minutes, to thereby fill the gap between the substrates with the liquid crystal. Thereafter, the substrate stack was taken out from the injection apparatus, the injection port was coated with a UV-curing epoxy adhesive and cured, to thereby obtain the liquid crystal cell.

(Bonding of Polarizer Plate)

A uniaxial film for optical compensation having a retardation of 38 nm was bonded to the liquid crystal cell, on the incident side for the transmitted light, in the direction perpendicular to the direction of orientation of the liquid crystal layer, and further on each of both surfaces thereof, a polarizer plate HLC2-2518 manufactured by Sanritz Corporation was bonded so as to align the absorption axes cross normal, to thereby obtain the liquid crystal panel.

A schematic sectional view of thus-produced liquid crystal panel was shown in FIG. 6(a). It is to be noted that illustration of some components including the alignment layer and transparent electrode of the liquid crystal cell are omitted for simplicity. In the drawing, "Pol" stands for the polarizer plate (HLC2-2518), "TAC" for a triacetyl cellulose film, "Glass" for the glass substrate, "CF layer" for the color filter layer, "λ/4(RGB)" for the optically anisotropic layer transferred from the transfer material R-2, G-2 or B-2, and "Retarder" for a uniaxial film for optical compensation.

(Production of Semi-Transmissive LCD for Comparison: Comparative Example 2)

Black (K) pattern, and red (R), green (G), blue (B) pixels were formed similarly to as described in Example 11. Using a transfer system (product of Fuji Photo Film Co., Ltd.) described in Fujifilm Research & Development No. 44 (1999), p. 25, the R, G and B color filter layers were formed on the substrate having the above-described black matrix already formed thereon, in an area thereof corresponded to the transmissive domain of the RGB pixel area. The thicknesses of layers of the individual colors were adjusted to 1.1 μm, 1.2 μm and 1.3 μm, respectively. Formation of the transparent electrode and formation of the alignment layer were carried out similarly to as descried in Example 11, and the opposing substrate was produced similarly to a method described in Example 11. It is to be noted herein that the thickness of an interlayer insulating film under the Al reflection plate was adjusted to 4.0 μm, and the height of the projections to 1.0 μm. The alignment layer and the seal were formed on the opposing substrate similarly to as described in Example 11, the opposing substrate was stacked with the separately produced color substrate, and the liquid crystal material was injected therebetween, to thereby produce the liquid crystal cell. A liquid crystal panel for the comparative purpose was obtained by bonding, on the surface of the liquid crystal cell, a polarizer plate, a λ/2 plate, a λ/4 plate, and a compensation film (NH film from Nippon Oil Corporation).

Figure 5:
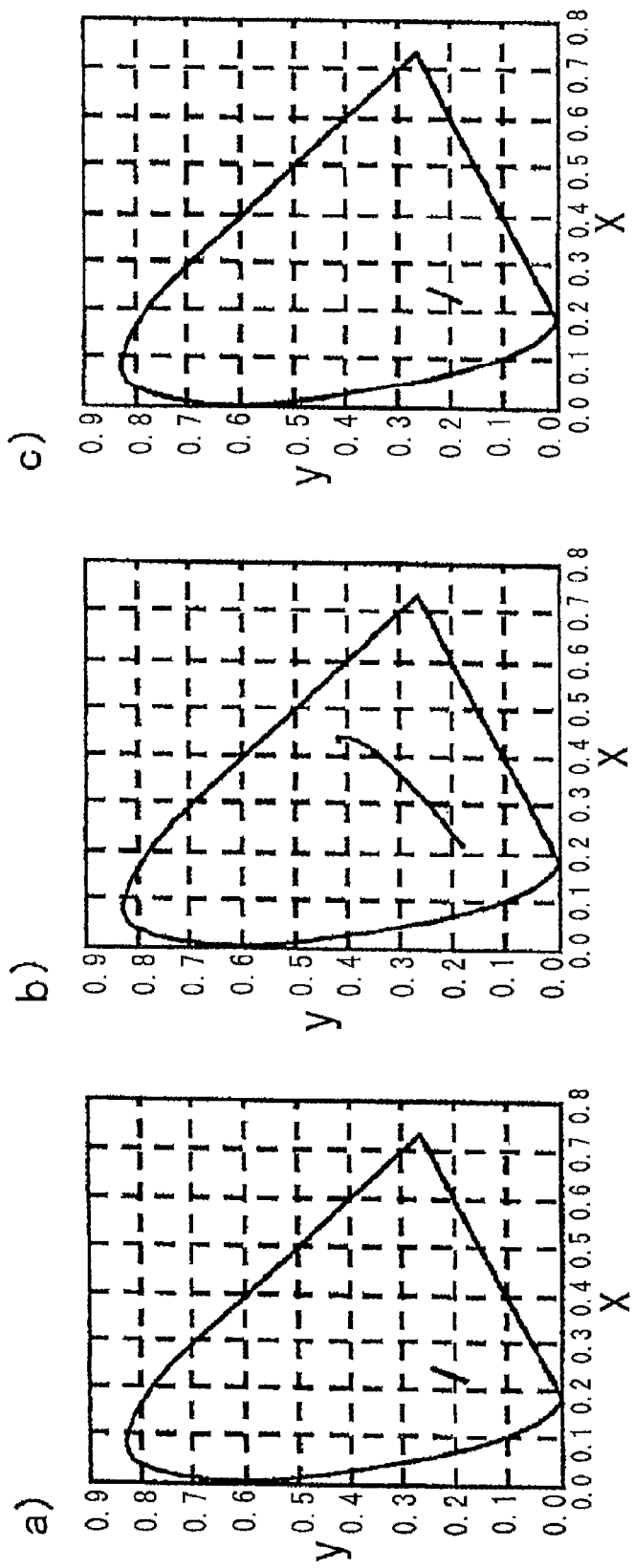
FIGS. 5(a) to 5(c) are drawings showing viewing angle dependence of color of a VA-LCD produced in Comparative Example 1.

A schematic sectional view of thus-produced liquid crystal panel was shown in FIG. 5(b). It is to be noted that illustration of some components including the alignment layer and transparent electrode of the liquid crystal cell are omitted for simplicity. In the drawing, any components commonly appear in FIG. 5(a) are given with the same reference numerals. "λ/2" stands for a commercial λ/2 plate, "λ/4" for a commercial λ/4 plate, and "NH" for an NH film used as an optical compensation film manufactured by Nippon Oil. Corporation.

(Comparison of Inventive Semi-Transmissive LCD and Conventional Semi-Transmissive LCD)

Figure 7:
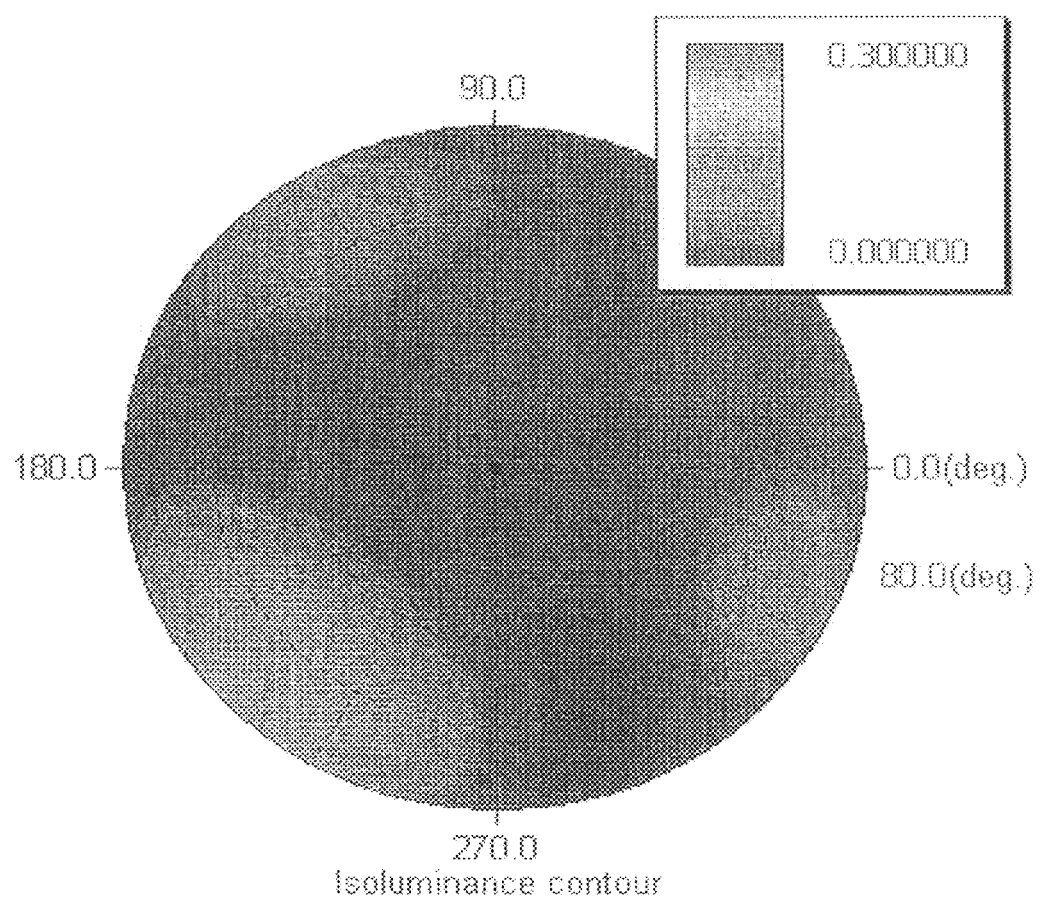
FIG. 7 is a drawing showing viewing angle dependence of luminance in a black state of the semi-transmissive liquid crystal display devices produced in Example 11.

Viewing angle characteristics of the transmitted light was measured using a viewing angle characteristics measuring instrument. Viewing angle characteristics of light leakage observed for Example 11 and Comparative Example 2 in a black state (under no applied voltage) were shown in FIG. 7 and FIG. 8. Example 11 showed a good black-level luminance-viewing angle characteristic, with almost non-sensible color shift in the black state. Comparative Example 2 showed light leakage when viewed at oblique angles.

From comparison of the sectional structure of the inventive liquid crystal display device of Example 11 with the conventional example (Comparative Example 2) as shown in FIGS. 6(a) and 6(b), it can be understood that Example 11 having the λ/4 plates patterned only in the reflective domains no more has an excessive retardation film, and therefore raises an advantage over the conventional configuration of Comparative Examples in terms of costs.

INDUSTRIAL APPLICABILITY

According to the present invention, it is possible to form an optically anisotropic layer inside of a liquid crystal cell easily, and, therefore, it is also possible to reduce dimensional changes of the optically anisotropic layer with influenced by temperature and humidity. And, thus, it is also possible to provide LCD improved in the corner non-uniformity, which is considered to generate due to the dimensional changes of the optically anisotropic layer. Use of the transfer material of the present invention also makes it possible to optically compensate retardation of a liquid crystal cell of each color, almost without increasing the number of steps for producing liquid crystal display device. The liquid crystal display device of the present invention having the color filter produced using the above-described transfer material is also improved not only in the display quality, but also in the viewing angle characteristics, in particular in the viewing angle dependence of color.

CROSS-REFERENCE TO RELATED APPLICATIONS

This application claims benefit of priorities under 35 USC 119 to Japanese Patent Application Nos. 2005-093976 filed Mar. 29, 2005, 2005-283382 filed Sep. 29, 2005, and 2006-036410 filed Feb. 14, 2006.

The invention claimed is:

1. A transfer material comprising, at least,
a support, and, thereon,
at most one pair of an optically uniaxial or biaxial anisotropic layer and
a photosensitive polymer layer comprising a photopolymerization initiator, an alkali-soluble polymer, and a monomer or oligomer;
wherein the optically uniaxial or biaxial anisotropic layer and the photosensitive polymer layer are disposed in this order on the support; and
the optically uniaxial or biaxial anisotropic layer is formed of a cured liquid crystal composition comprising a liquid crystalline compound.

2. The transfer material of claim 1, wherein the optically anisotropic layer is a layer formed by applying a fluid comprising a liquid crystalline compound having at least one reactive group to a surface and drying the fluid to thereby form a liquid crystal layer, and then applying heat or irradiating ionized radiation to the liquid crystal layer.

3. The transfer material of claim 2, wherein the ionized radiation is polarized ultraviolet radiation.

4. The transfer material of claim 2, wherein the liquid crystalline compound is a rod-like liquid crystalline compound.

5. The transfer material of claim 2, wherein the liquid crystalline compound is a discotic liquid crystalline compound.

6. The transfer material of claim 2, wherein the reactive group is an ethylenic unsaturated group.

7. The transfer material of claim 1, further comprising an alignment layer on the support, wherein the optically anisotropic layer is formed on a surface of the alignment layer.

8. The transfer material of claim 2, wherein the optically anisotropic layer is a layer formed by applying heat or irradiating ionized radiation to the liquid crystal layer exhibiting a cholesteric phase.

9. The transfer material of claim 1, wherein a frontal retardation (Re) value of the optically anisotropic layer is not zero, and the optically anisotropic layer gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis).

10. The transfer material of claim 1, wherein the optically anisotropic layer has a frontal retardation (Re) value of 60 to 200 nm, and gives a retardation of 50 to 250 nm when light of a wavelength λ nm coming in a direction rotated by +40° with respect to a normal direction of a layer plane using an in-plane slow axis as a tilt axis (a rotation axis).

11. The transfer material of claim 1, wherein the photosensitive polymer layer comprises a dye or a pigment.

12. A process for producing a liquid crystal cell substrate comprising at least steps [1] to [4] below:
   [1] laminating the transfer material as set forth in claim 1 on a substrate;
   [2] removing the support from the transfer material laminated on the substrate;
   [3] patterning the photosensitive polymer layer disposed on the substrate using light exposure; and
   [4] removing unnecessary portions of the photosensitive polymer layer and the optically anisotropic layer from on the substrate.

13. A liquid crystal cell substrate produced according to a method as set forth in claim 12.

14. A liquid crystal display device comprising a liquid crystal cell substrate as set forth in claim 13.

15. The liquid crystal display device of claim 14, employing a VA or IPS mode as a liquid crystal mode.

16. The liquid crystal display device of claim 14, comprising a semi-transmissive liquid crystal panel.

17. The transfer material of claim 2, wherein the photosensitive polymer layer is a layer formed after the optically uniaxial or biaxial anisotropic layer is formed.

18. The transfer material of claim 1, wherein the photosensitive polymer layer is used as a color filter layer.

19. The transfer material of claim 1, wherein the photosensitive polymer layer can generate difference in transferability between an exposed region and a non-exposed region after being irradiated by light.

20. The transfer material of claim 1, wherein the optically uniaxial or biaxial anisotropic layer has a frontal retardation (Re) value of 60 to 200 nm.

* * * * *